United States Patent [19]

Morinaga

[11] Patent Number: 4,629,339
[45] Date of Patent: Dec. 16, 1986

[54] ROLLER BEARING

[75] Inventor: Nozomu Morinaga, Fujisawa, Japan

[73] Assignee: Nippon Seiko Kabushiki Kaisha, Tokyo, Japan

[21] Appl. No.: 815,286

[22] Filed: Dec. 27, 1985

Related U.S. Application Data

[63] Continuation of Ser. No. 569,715, Jan. 10, 1984, abandoned.

[30] Foreign Application Priority Data

Jan. 21, 1983 [JP] Japan ............................. 58-6094[U]
Nov. 2, 1983 [JP] Japan ......................... 58-169227[U]
Nov. 4, 1983 [JP] Japan ......................... 58-170029[U]

[51] Int. Cl.$^4$ ...................... F16C 33/56; F16C 33/36; F16C 33/48
[52] U.S. Cl. .................................................. 384/576
[58] Field of Search .............................. 384/572–580, 384/470, 568

[56] References Cited

U.S. PATENT DOCUMENTS

| 2,611,670 | 9/1952 | Palmgren | 384/577 |
| 3,051,534 | 8/1962 | Kohler et al. | 384/576 |
| 3,350,149 | 10/1967 | Oechsler | 384/572 |
| 3,547,504 | 12/1970 | Bobowicz et al. | 384/568 X |
| 3,720,450 | 3/1973 | Dominik | 384/572 |
| 3,912,346 | 10/1975 | Boratynski et al. | 384/568 |
| 4,222,620 | 9/1980 | Mirring | 384/576 |
| 4,225,199 | 9/1980 | Earsley | 384/470 |
| 4,288,129 | 9/1981 | Ryanen | 384/576 |

Primary Examiner—Stuart S. Levy
Assistant Examiner—Thomas R. Hannon
Attorney, Agent, or Firm—Shapiro and Shapiro

[57] ABSTRACT

A self-aligning roller bearing in which a retainer is disposed between an outer race and an inner race. The retainer has two axially spaced apart annular portions integrally connected together by a plurality of circumferentially spaced apart cross bars and barrel shaped rollers are disposed in a pocket surrounded by the two adjacent cross bars and the two annular portions. The roller bearing is characterized in that the retainer is made of synthetic resin, the side surfaces of the cross bars forming the pocket have concavely curved surfaces corresponding to the rolling surface of the spherical roller in a portion inside the bearing and a portion outside the bearing with respect to a plane perpendicular to a plane containing the axis of the bearing and the axis of the spherical roller and containing the axis of the roller, and the retainer has a portion in which the spacing between the outer peripheral surface of a cross bar and the outer peripheral surface of the adjacent cross bar is shorter than the diameter of the roller in the opposed portions thereof and a portion in which the spacing between the inner peripheral surface of a cross bar and the inner peripheral surface of the adjacent cross bar is shorter than the diameter of the roller in the opposed portions thereof.

14 Claims, 52 Drawing Figures

4,629,339

ROLLER BEARING

CROSS-REFERENCE TO RELATED APPLICATION

This application is a continuation of application Ser. No. 569,715, filed Jan. 10, 1984, now abandoned.

BACKGROUND OF THE INVENTION

1. Field of the Invention

This invention relates to a roller bearing, and more particularly to a self-aligning roller bearing in which the side surfaces of the cross bars of a retainer are in surface contact with spherical rollers and the contact surface pressure of the retainer and the spherical rollers is low.

2. Description of the Prior Art

In a typical self-aligning roller bearing according to the prior art, as shown in FIGS. 1 to 3 of the accompanying drawings, a pair of metallic retainers 3 are disposed between an outer race 1 and an inner race 2. Each of these retainers 3 is such that an annular portion 4 inside the bearing and an annular portion 5 outside the bearing are connected together and made integral with each other by cross bars 6. A spherical section roller 12 is disposed in the pocket 11 of each retainer 3. The side surfaces 13 of the cross bars forming the pocket 11 have concavely curved surfaces 18 with axial and radical arcs of a curvature corresponding to the spherical rolling surface 17 of the roller 12, at the side of the bearing that is inward of a plane 16 perpendicular to a plane 15 containing the axis of the bearing and the axis 14 of the spherical roller, and containing the axis 14 of the spherical roller. The side surfaces 13 of the cross bars have a semicylindrical surface 19 outwardly of the plane 16.

Accordingly, the cylindrical surface 19 does not make surface contact but does make line contact with the spherical roller 12. Therefore, the area of contact between the side surfaces 13 of the cross bars and the spherical roller 12 is small and the contact surface pressure of the side surface 13 of the cross bar and the spherical roller 12 is high and thus, abrasion of the cross bars 6 is great. When the retainers 3 come into contact with the inner race 2 due to gravity, that is, when the retainers 3 shown in FIG. 3 move downwardly relative to the roller 12, the circumferential clearance between the roller 12 and the side surfaces 13 of the cross bars is great and the roller 12 becomes liable to be inclined and skewed. Also, since the spacing A between the outer peripheral surface 21 of a cross bar and the outer peripheral surface 21 of the adjacent cross bar is greater than the diameter of the corresponding portion of the spherical roller 12, the circumferential width dimension of the outer peripheral surfaces 21 of the cross bars is short and the rigidity of the cross bars 6 is weak. Further, the spherical roller 12 disposed in the pocket 11 falls off from within the pocket 11 through the cylindrical surface 19 during the assembly of the bearing and therefore, assembly of the bearing is difficult and also automation of the assembly of the bearing is difficult.

SUMMARY OF THE INVENTION

It is an object of the present invention to provide a self-aligning roller bearing in which abrasion of retainers is low and rigidity of cross bars is strong and which is easy to assemble.

It is also an object of the present invention to provide a self-aligning roller bearing in which skew of rollers is prevented.

The invention will become fully apparent from the following detailed description thereof taken in conjunction with the accompanying drawings.

DETAILED DESCRIPTION OF THE PREFERRED EMBODIMENTS

Figure 1:
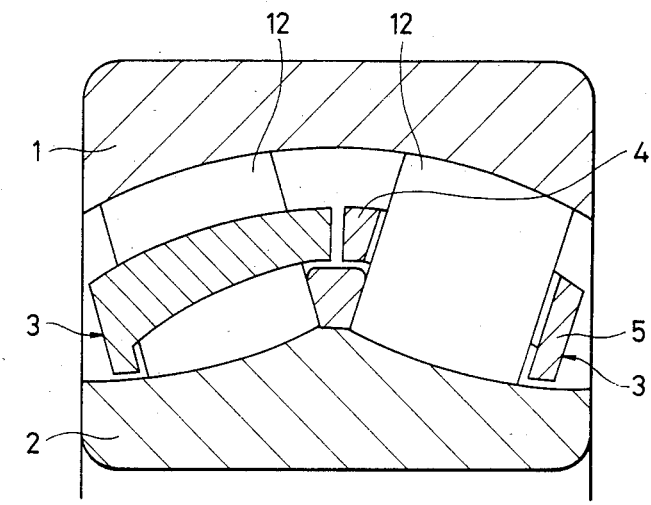
FIG. 1 is a cross sectional view of a double-row self-aligning roller bearing according to the prior art.
Figure 2:
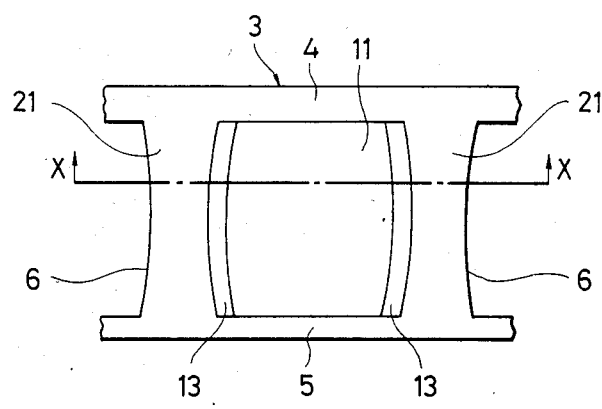
FIG. 2 is a plan view of the retainer shown in FIG. 1.
Figure 3:
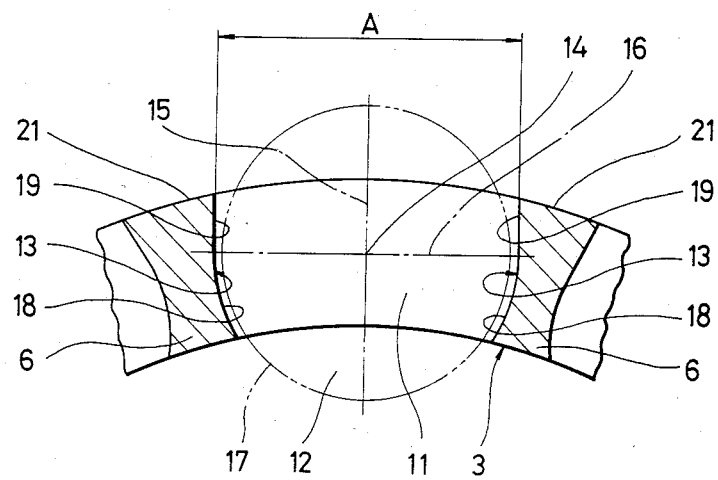
FIG. 3 is an enlarged cross-sectional view taken along the line X—X of FIG. 2.
Figure 4:
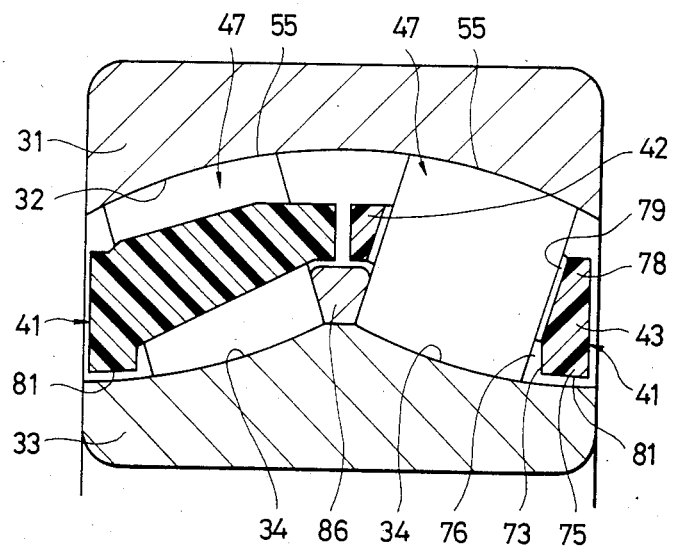
FIG. 4 is a cross-sectional view of a double-row self-aligning roller bearing according to a first embodiment of the present invention.
Figure 5:
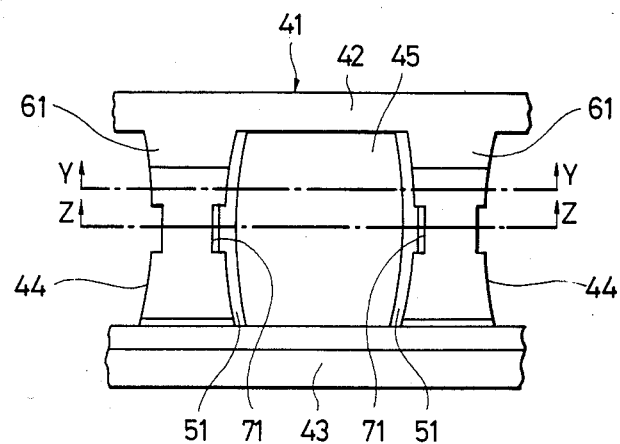
FIG. 5 is a plan view of the retainer shown in FIG. 4.
Figure 6:
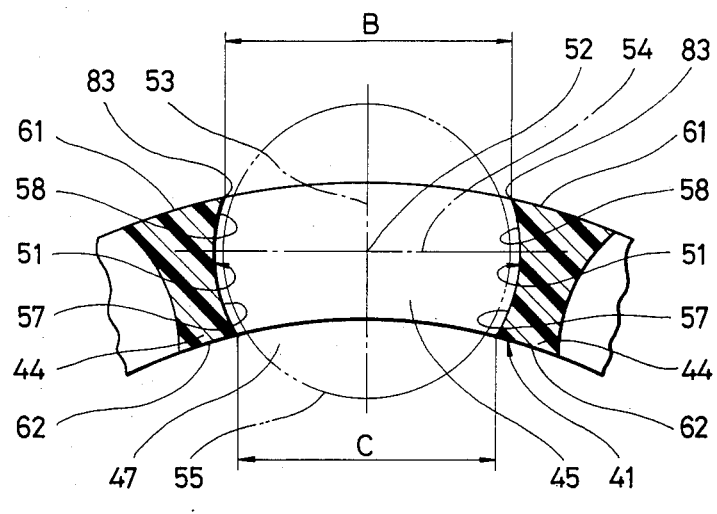
FIG. 6 is an enlarged cross-sectional view taken along the Y—Y of FIG. 5.
Figure 7:
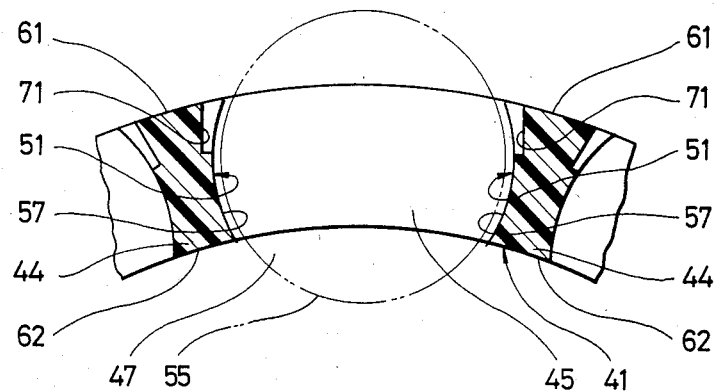
FIG. 7 is an enlarged cross-sectional view taken along the line Z—Z of FIG. 5.

Embodiments of the present invention will hereinafter be described by reference to the drawings. Referring to FIGS. 4 to 6, an outer race 31 has a spherical outer race track 32 and an inner race 33 has two rows of spherical inner race tracks 34. A pair of retainers 41 made of synthetic resin are disposed between the outer race 31 and the inner race 33, and each of these retainers 41 is such that an annular portion 42 axially inside the bearing and an annular portion 43 axially outside the bearing are connected together and made integral with each other by cross bars 44. A barrel-shaped bearing roller 47 is disposed in the pocket 45 of each retainer 41, and each of the side surfaces 51 of the cross bars forming the pocket 45 has concavely, curved surfaces 57 and 58 with axial and radial arcs of a curvature corresponding to the rolling surface 55 of the roller, radially inside and radially outside the bearing with respect to a plane 54 perpendicular to a plane 53 containing the axis of the bearing and the axis 52 of the roller and containing the axis 52 of the roller. That is, each of the concavely curved surfaces 57 and 58 is such that the cross-section thereof by the plane 54 containing the axis 52 of the barrel shaped roller is arcuate, and also each of the concavely curved surfaces 57 and 58 is such that the cross-section thereof by a plane perpendicular to the axis of the bearing is arcuate. Since the side surfaces 51 of the cross bars make surface contact with the barrel-shaped roller 47, the area of contact between the side surfaces 51 of the cross bars and the roller 47 is great and, since the contact surfaces pressure of the side surface 51 of the cross bars and the roller 47 is low, abrasion of the cross bars 44 is low. The spacing B between the outer peripheral surface 61 of a cross bar and the outer peripheral surface 61 of the adjacent cross bar and the spacing C between the inner peripheral surface 62 of a cross bar and the inner peripheral surface 62 of the adjacent cross bar are both shorter than the diameter of the corresponding portion of the roller 47. Accordingly, the circumferential width dimension of the outer peripheral surfaces 61 of the cross bars and the circumferential width dimension of the inner peripheral surfaces of the cross bars are both long and therefore, the rigidity of the cross bars 44 is strong. Also, the roller 47 is prevented from falling off from within the pocket 45 and therefore, assembly of the bearing and automation of the assembly of the bearing are easy. Radial grooves 71 are provided in the axial central portion of the side surfaces 51 of the cross bars and a lubricant such as grease is held in these grooves 71. The lubricant in the grooves 71 flows out into the pocket 45 and this improves the lubrication performance of the bearing. Also, even if the radius of curvature of the side surfaces 51 of the cross bars becomes greater than the radius of curvature of the rolling surface 55 of the barrel shaped roller due to the machining accuracy, deformation, etc. of the retainers 41, the spherical roller 47 contacts two or more axial portions of the side surfaces 51 of the cross bars and therefore, the side surfaces 51 of the cross bars do not suffer from abnormal abrasion. The side surface 73 of the inner peripheral portion of the annular portion axially outside the bearing which is radially inside the bearing is a flat surface perpendicular to the axis of the bearing, and the clearance 76 between the inner peripheral portion 75 of the annular portion axially outside the bearing and the roller 47 is larger than the clearance 79 between the outer peripheral portion 78 of the annular portion axially outside the bearing and the roller 47. Accordingly, even if the inner peripheral portion 75 of the annular portion axially outside the bearing goes along the inside of the bearing during the injection molding of the retainers 41, the inner peripheral portion 75 of the annular portion axially outside the bearing will not restrain the end surface of the roller 47 during the operation of the bearing. A lubricant such as grease is held in the clearance 76 between the inner peripheral portion 75 of the annular portion axially inside the bearing and the roller 47, and the lubricant in this clearance 76 flows out into the pocket 45, so that the oil film breakage by the edge at the boundary between the end surface of the roller 47 which is axially outside the bearing and the rolling surface 55 of the roller is prevented. The inner peripheral surface of the annular portion 43 axially outside the bearing provides a retainer guide surface 81 which is guided by the retainer guide surface of the inner race 33.

Figure 8:
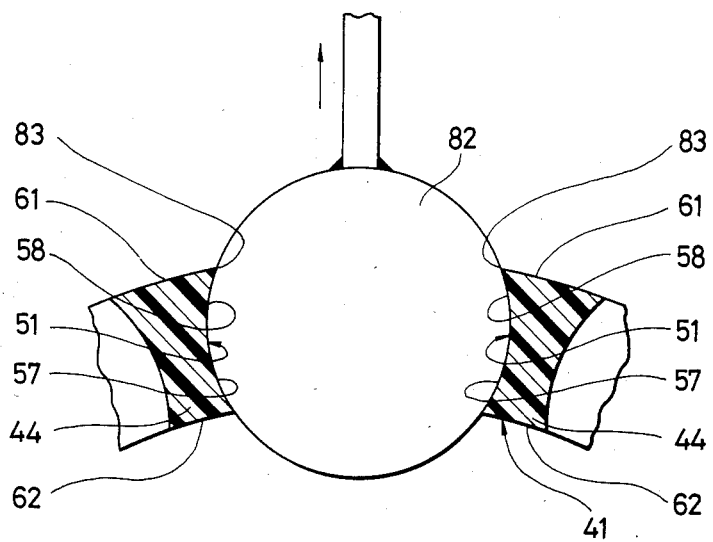
FIG. 8 illustrates the procedure when a metal mold in the pocket is removed during the injection molding of the retainer shown in FIG. 4.

The retainers 41 may be manufactured by injection molding of synthetic resin, and more specifically by a metal mold 82 in the form of a barrel shaped roller positioned in the pocket as shown in FIG. 8 being removed radially outwardly. In this case, as shown in FIG. 6, the spacing B between the outer peripheral surface of a cross bar and the outer peripheral surface of the adjacent cross bar is shorter than the diameter of the corresponding portion of the barrel shaped roller 47 and therefore, the boundary portion between a outer peripheral surface of the cross bar and the side surface of the cross bar is somewhat resiliently deformed. If the aforementioned metal mold 82 is pulled out radially outwardly, the spacing C between the inner peripheral surface of a cross bar and the inner peripheral surface of the adjacent cross bar can be made smaller than the spacing B between the outer peripheral surface of a cross bar and the outer peripheral surface of the adjacent cross bar. When the roller 47 is inserted into the pocket 45, the boundary portion 83 between the outer peripheral surface of the cross bar and the side surface of the cross bar is somewhat resiliently deformed. A float guide race 86 is disposed between the two rows of inner race tracks 34 and is fitted to the inner race 33. The float guide race 86 is guided by the inner race 33 and guides the end surface of the roller 47 which is axially inside the bearing and the retainers 41.

Figure 9:
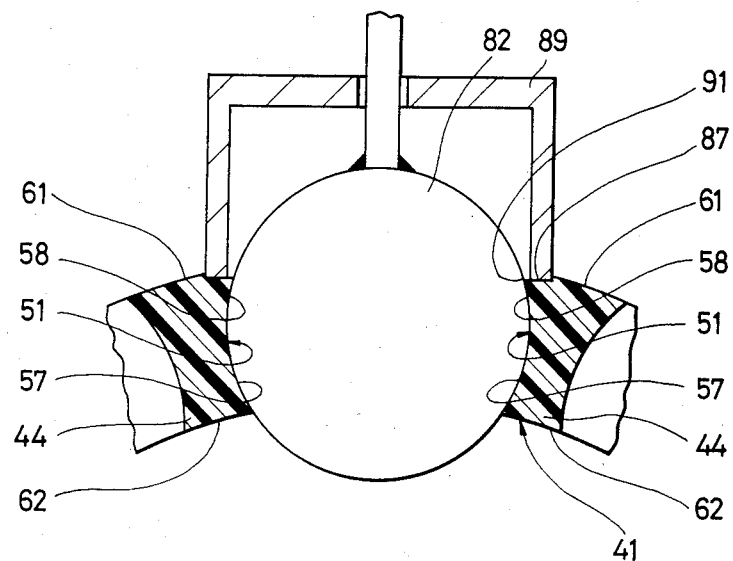
FIG. 9 illustrates the procedure when a metal mold in the pocket is removed during the injection molding of a modification of the retainer of the first embodiment.

FIG. 9 illustrates the procedure when a metal mold in the pocket is removed during the injection molding of a modification of the retainers used in a first embodiment. The retainers 41 made of synthetic resin are formed around the metal mold 82 in the form of a barrel shaped roller. A stepped concave guide portion 87 is provided between the outer peripheral surface 61 and the side surface 51 of each cross bar, and a U-shaped keep member 89 is disposed in this guide portion 87. The metal mold 82 is pulled out of the pocket radially outwardly with the guide portion held down by the keep member 89. In this case, the boundary portion 91 between the guide portion and the side surface of the cross bar is somewhat resiliently deformed, but flagging of this boundary portion 91 is small because the guide portion 87 is held down by the keep member 89. Also, the guide portion 87 guides the roller 47 when the latter is inserted into the pocket 5 and thus, the roller 47 can be smoothly inserted into the pocket 45.

Figure 10:
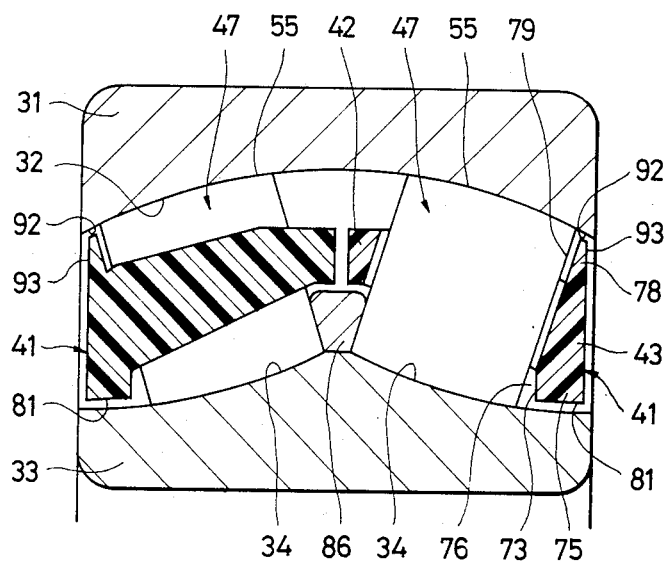
FIGS. 10 to 15 are cross-sectional views of double-row self-aligning roller bearings according to second to seventh embodiments of the present invention.

FIG. 10 shows a second embodiment having a sealing performance. The outer peripheral surface of an annular portion 93 axially outside the bearing and a sealing surface 92 provided on the outer race 31 together constitute a contact or non-contact sealing portion. Also, the guide surfaces 81 of the retainers and the retainer guide surface of the inner race 33 together constitute a sealing portion and therefore, lubricant in the bearing is hermetically sealed and this bearing is one in which the bearing width is not long and the number of parts is not great and which is reduced in cost and has a sealing performance. This bearing is also a standard sealing type self-aligning roller bearing of international interchangeability whose outside diameter, inside diameter and width are invariable.

Figure 11:
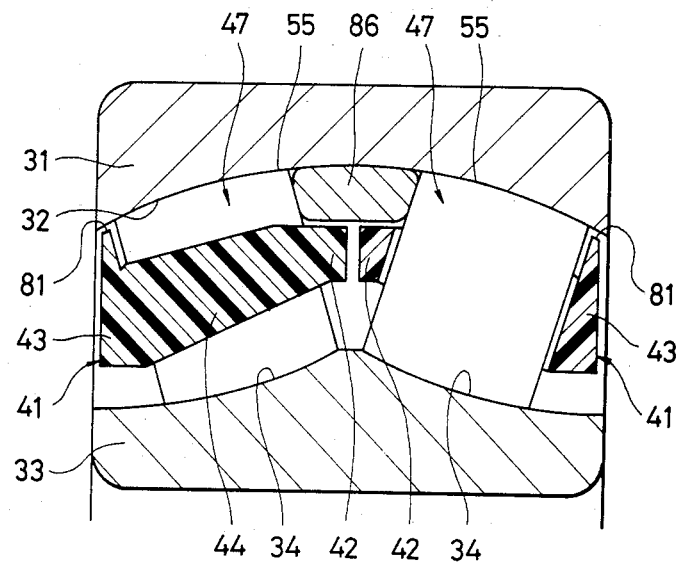

FIG. 11 shows a third embodiment in which the retainers are guided by the outer race. The outer periphery of the annular portion 43 axially outside the bearing provides a retainer guide surface 81 which is guided by the retainer guide surface of the outer race 31. Also, a float guide race 86 is disposed between two rows of barrel shaped rollers 47 and is fitted to the outer race 31. The float guide race 86 is guided by the outer race 31 and guides the end surface of the barrel shaped rollers 47 which is inside the bearing and the retainers 41.

Figure 12:
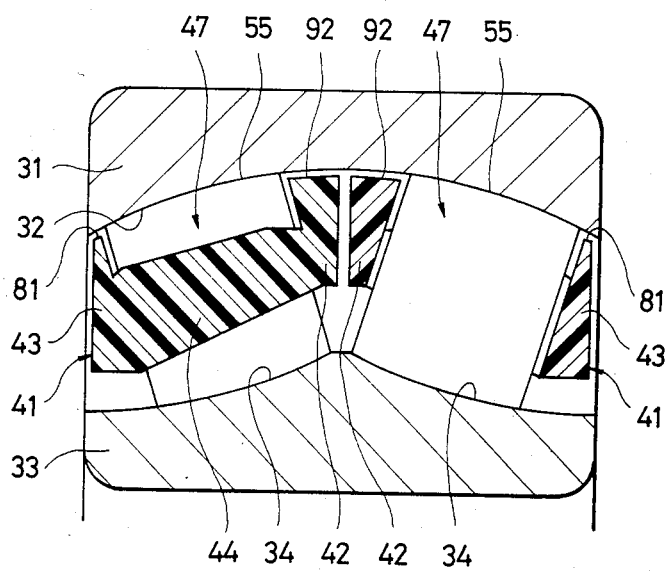

FIG. 12 shows a fourth embodiment in which the retainers are guided by the outer race. The outer peripheral surface of the annular portion 42 axially inside the bearing provides a retainer guide surface 92 which is guided by the retainer guide surface of the outer race 31. The float guide race is eliminated in this embodiment.

Figure 13:
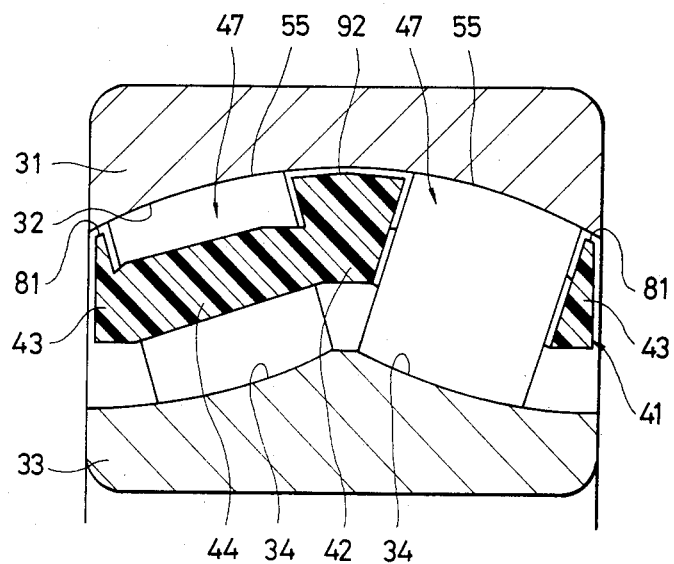

FIG. 13 shows a fifth embodiment in which the annular portions on both axial sides outside the bearing are integral with each other and formed by a single member. The annular portion 42 axially inside the bearing is integrally connected to the annular portions 43 on both axial sides outside the bearing by a cross bar 44. Accordingly, a retainer 41 is disposed between the outer race 31 and the inner race 33.

Figure 14:
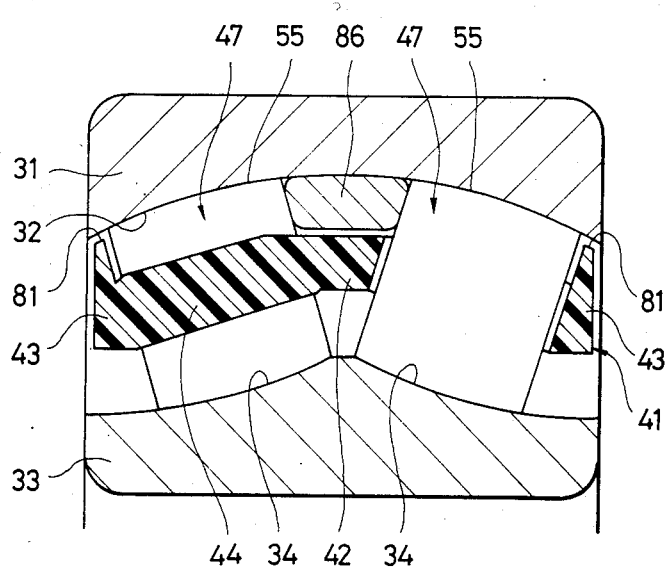

FIG. 14 shows a sixth embodiment in which the annular portions on both axial sides outside the bearing are integral with each other and formed by a single member. A float guide race 86 disposed between two rows of barrel shaped rollers 47 is fitted to the outer race 31. The float guide race 86 is guided by the outer race 31 and guides the end surface of the barrel shaped rollers 47 which is axially inside the bearing and the retainer 41.

Figure 15:
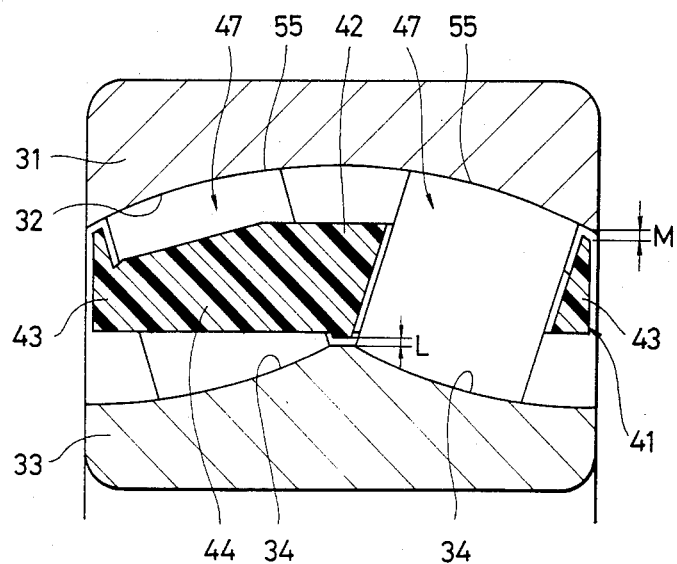

FIG. 15 shows a seventh embodiment in which the annular portions on both axial sides outside the bearing are integral with each other and formed by a single member. The annular portion 42 axially inside the bearing is fitted to the inner race 33. Accordingly, the inner race 33 guides the retainer 41, and the float guide race is eliminated.

Figure 16:
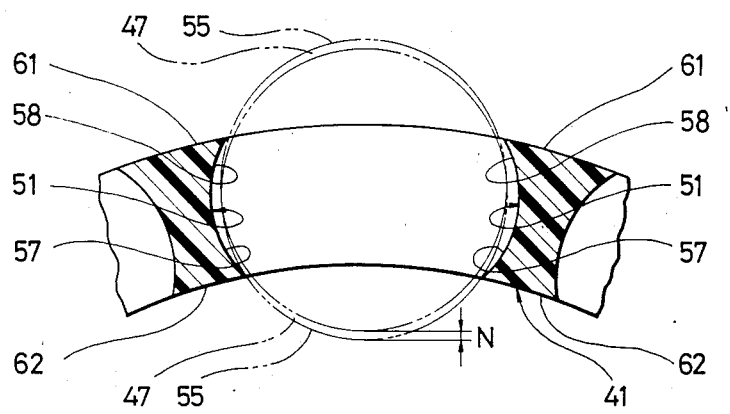
FIG. 16 illustrates the radial clearance between the side surfaces of the cross bars and the spherical roller.

If both the radial clearance L between the retainer 41 and the inner race 33 and the radial clearance M between the retainer 41 and the outer race 31 are made greater than the radial clearance N between the side surfaces 51 of the cross bars shown in FIG. 16 and the barrel shaped roller 47, the retainer 41 will be guided by the barrel shaped roller 47 without contacting the track races 31 and 33, avoiding a lock phenomenon in which the retainer 41 becomes integral with the track races 31 and 33 due to its thermal contraction or thermal expansion.

Although, in the above-described embodiment, a groove 71 is provided in the side surfaces 51 of the cross bars, the groove 71 may not be provided but instead, the whole or a part of the side surfaces 51 of the cross bars may be made into concavely curved surfaces 57 and 58.

Reference is now had to FIGS. 17 to 35 to describe embodiments in which a radial groove is provided in the boundary portion between the side surfaces of the cross bars forming the pocket of the retainer and the annular portion.

Figure 17:
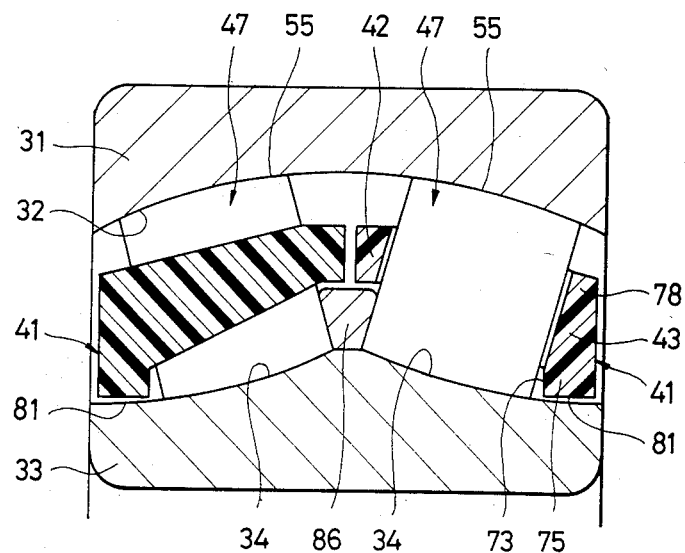
FIG. 17 is a cross-sectional view of a bearing according to an eighth embodiment of the present invention.
Figure 18:
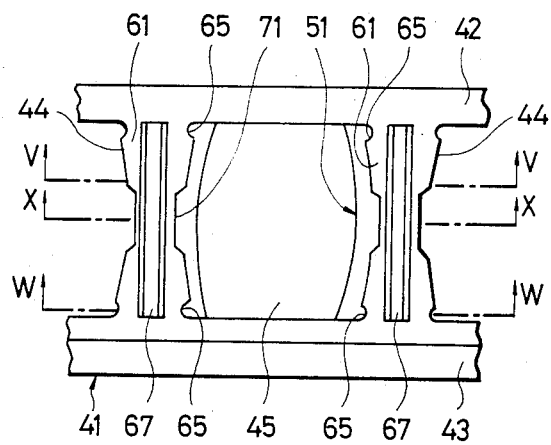
FIG. 18 is a plan view of the retainer shown in FIG. 17.

FIG. 17 shows an eighth embodiment of the double-row self-aligning roller bearing. The outer race 31 has a spherical outer race track 32, and the inner race 33 has two rows of inner race tracks 34 axially spaced apart from each other. Two retainers 41 made of synthetic resin are disposed between the outer race 31 and the inner race 33 and these two retainers 41 are plane-symmetrical with respect to a plane passing through and perpendicular to the axis of the bearing. Each of the retainers 41 is such that, as shown in FIG. 18, two axially spaced apart annular portions 42 and 43 are connected together by a plurality of circumferentially equally spaced apart cross bars 44, and the two annular portions 42 and 43 are integral with the plurality of cross bars 44. A barrel shaped roller 47 is disposed in a pocket 45 surrounded by the two adjacent cross bars 44 and the two annular portions 42, 43. The side surfaces 51 of the cross bars forming the pocket 45 have concavely curved surfaces 57 and 58 each having an arc of a curvature corresponding to the rolling surface 55 of the roller axially and radially of the bearing, in a portion inside the bearing and a portion outside the bearing with respect to a plane 54 perpendicular to a plane 53 containing the axis of the bearing and the axis of the roller and containing the axis of the roller. The side surfaces 51 of the cross bars make surface contact with the roller 47 and therefore, the area of contact between the side surfaces 51 of the cross bars and the roller 47 is great and the contact surface pressure of the side surfaces 51 of the cross bars and the roller 47 is low and thus, abrasion of the cross bars 44 is small.

Both the spacing B between the outer peripheral surface of a cross bar and the outer peripheral surface of the adjacent cross bar and the spacing C between the inner peripheral surface of a cross bar and the inner peripheral surface of the adjacent cross bar are shorter than the diameter of the rollers 47 in the opposed portions thereof. Accordingly, both the circumferential width dimension of the outer peripheral surfaces 61 of the cross bars and the circumferential width dimension of the inner peripheral surfaces 62 of the cross bars are great and therefore, the rigidity of the cross bars 44 is strong and also, the rollers 47 are prevented from falling off from within the pocket 5 and thus, assembly of the bearing is easy.

Figure 19:
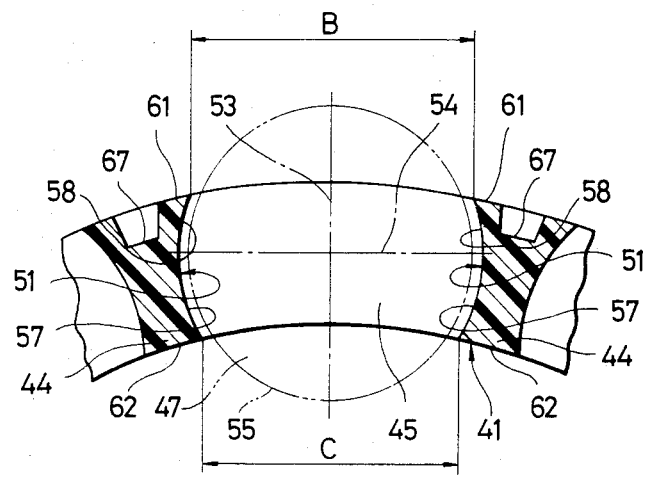
FIG. 19 is an enlarged cross-sectional view taken along the line V—V of FIG. 18.
Figure 20:
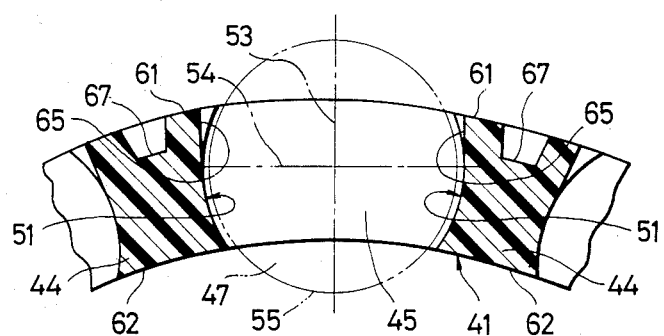
FIG. 20 is an enlarged cross-sectional view taken along the line W—W of FIG. 18.
Figure 21:
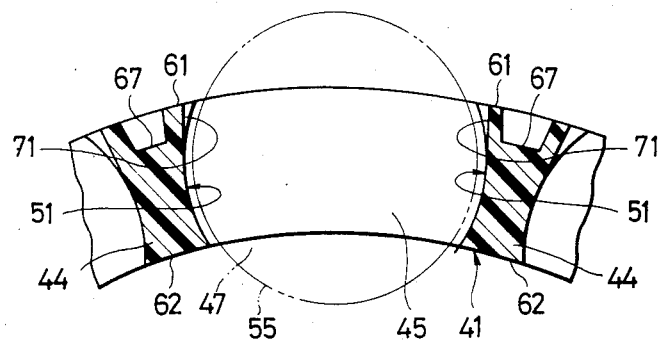
FIG. 21 is an enlarged cross-sectional view taken along the line X—X of FIG. 18.

As shown in FIGS. 18 and 19, grooves 65 extending radially of the bearing and having an arcuate cross-section are provided in the circumferentially outer peripheral portion of the bearing in the boundary portions between the side surfaces 51 of the cross bars and the annular portions 42, 43, and these radially extending grooves 65 alleviate the concentration of stress applied to the boundary portions between the side surfaces 51 of the cross bars and the annular portions 42, 43 to thereby prevent the retainers 41 from being destroyed and the shape of the side surfaces 51 of the cross bars from being disturbed during the injection molding of the retainers 41, during the insertion of the rollers 47 into the pocket 45 and during the operation of the bearing.

Axially extending grooves 67 are provided in the circumferentially central portions of the outer peripheral surfaces 61 of the cross bars, and these axially extending grooves 67 make the circumferential opposite ends of the outer peripheral surfaces 61 of the cross bars easy to be resiliently deformed during the injection molding of the retainers 41 and during the insertion of the rollers 47 into the pocket 45 and are therefore effective to prevent the shape of the side surfaces 51 of the cross bars from being disturbed and the retainers 41 from being destroyed.

Groove-like recesses 71 extending radially of the bearing are provided in the axially central portions of the side surfaces 51 of the cross bars and a lubricant such as grease is held in these recesses 71. The lubricant in the recesses 71 flows out into the pocket 45 and this improves the lubrication performance of the bearing. Also, even if the radius of curvature of the axial arcs of the side surfaces 51 of the cross bars becomes greater than the radius of curvature of the axial arcs of the rolling surfaces 55 of the rollers due to the machining accuracy, deformation, etc. of the retainers 41, the rollers 47 contact two or more axial portions of the side surfaces 51 of the cross bars and therefore, the rollers 47 are stably supported against the side surfaces 51 of the cross bars. The aforementioned recesses 71 reduce the force applied to the boundary portions between the side surfaces 51 of the cross bars and the annular portions 42, 43 during the injection molding of the retainers 41 and during the insertion of the rollers 47 into the pocket 45.

The side surface 73, which is axially inside the bearing, of the more inner portion 75 than the inner peripheral surface 62 of the cross bar in the annular portion 43 axially outside the bearing is a flat surface perpendicular to the axis of the bearing. The clearance between this more inner portion 75 and the rollers 47 is greater than the clearance between the roller 47 and the portion 78 that is between the inner peripheral surface and the outer peripheral surface of the cross bar in the annular portion 43 axially outside the bearing. Accordingly, the more inner portion 75 tends to be warped inwardly of the bearing by the deformation during the injection molding of the retainers 41, the deformation resulting from the centrifugal force during the operation of the bearing and the deformation resulting from the temperature rise during the operation of the bearing, but this portion 75 does not restrain the end surfaces of the rollers 47 during the operation of the bearing. A lubricant such as grease is held in the clearance between the more inner portion 75 than the inner peripheral surface of the cross bar in the annular portion axially outside the bearing and the rollers 47, and the lubricant in this clearance flows out into the pocket 45 and this prevents the oil film breakage by the edge of the boundary portion between the end surfaces of the rollers 47 which are axially outside the bearing and the rolling surfaces 55 of the rollers 47. The inner peripheral surface of the annular portion 43 axially outside the bearing is a retainer guide surface 81 which is guided by the retainer guide surface of the inner race 33.

Figure 22:
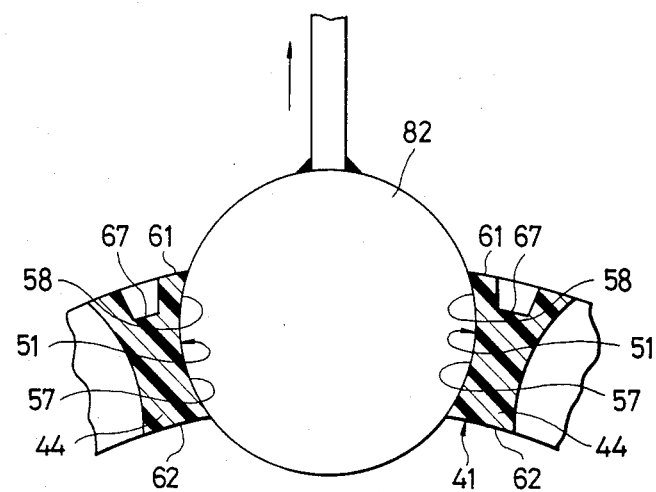
FIG. 22 illustrates the procedure when a metal mold in the pocket is removed.

The retainers 41 may be manufactured by injection molding of synthetic resin and more specifically, by removing a metal mold 82 in the pocket radially outwardly as shown in FIG. 22. In this case, the circumferential opposite ends of the outer peripheral surfaces 61 of the cross bars are somewhat resiliently deformed, and also the circumferential opposite ends of the outer peripheral surfaces 61 of the cross bars are somewhat resiliently deformed during the insertion of the rollers 47 into the pocket 45.

A float guide race 86 is disposed between the two rows of inner race tracks 34 and is fitted to the inner race 33. The float guide race 86 is guided by the inner race 33 and guides the end surface of the roller 47 which is axially inside the bearing and the retainers 41.

Figure 23:
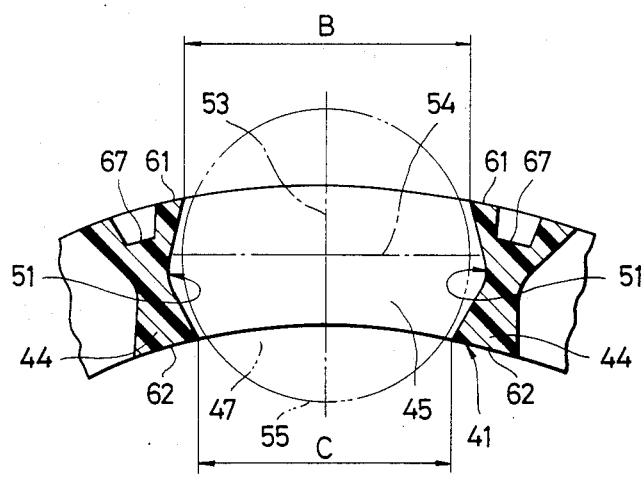
FIG. 23 is an enlarged cross-sectional view showing a modification of the retainer used in the eighth embodiment.

FIG. 23 shows a first modification of the retainer used in the eighth embodiment. The side surfaces 51 of the cross bars are such that the cross-section by a plane perpendicular to the axis of the roller 47 is a quadratic curve. The other portions of the embodiment shown in FIG. 23 are constructed similarly to the embodiment shown in FIGS. 17 to 21.

Figure 24:
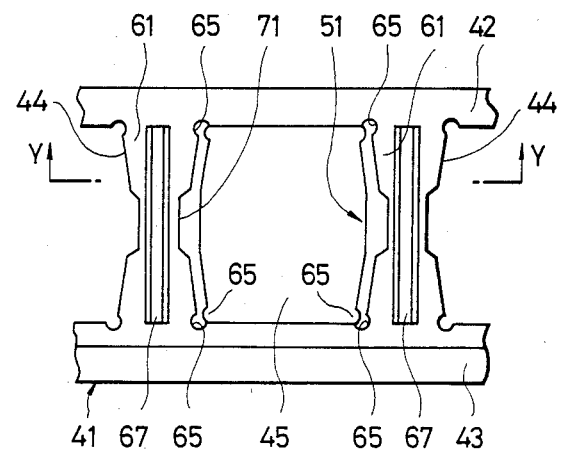
FIG. 24 is a plan view of a second modification of the retainer used in the eighth embodiment.

FIG. 24 shows a second modification of the retainer used in the eighth embodiment. In the boundary portions between the side surfaces 51 of the cross bars and the annular portions 42, 43, radially extending grooves 65 are provided on the outer periphery side and the inner periphery side in the radial direction of the bearing.

Figure 25:
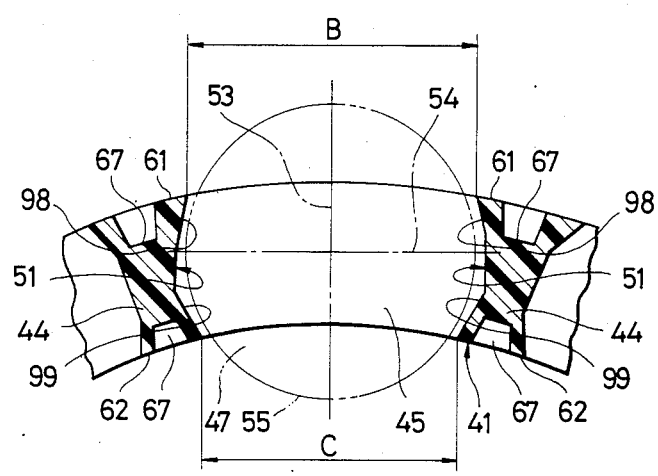
FIG. 25 is an enlarged cross-sectional view taken along the line Y—Y of FIG. 24.
Figure 26:
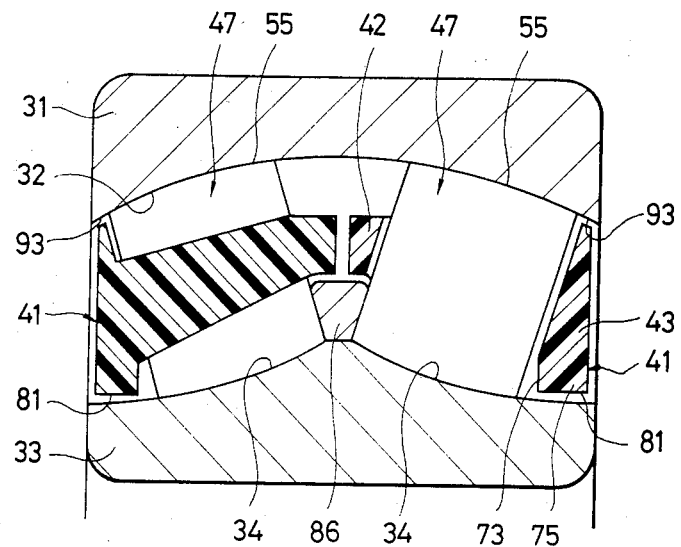
FIGS. 26, 27, 28, 29, 30 and 31 are cross-sectional views of bearings according to ninth to fourteenth embodiments of the present invention.

Also, axially extending grooves 67 are provided in the circumferential central portions of the inner peripheral surfaces 62 of the cross bars. Further, the opposite side portions from the axially central portion of the side surface 51 of the cross bar, as shown in FIG. 25, have planar portions 98 and 99 adapted to contact the rolling surface 55 of the roller during the operation of the bearing, in a portion inside the bearing and a portion outside the bearing with respect to a plane 54 perpendicular to a plane 53 containing the axis of the bearing and the axis of the roller and containing the axis of the roller. The other portions of the present embodiment are constructed similarly to the embodiment shown in FIGS. 17 to 21.

FIGS. 26 to 31 show double-row self-aligning roller bearings according to further embodiments of the present invention. In the ninth embodiment of FIG. 26, the outer peripheral surface of the annular portion 43 axially outside the bearing and a sealing surface 93 provided on the outer race 31 together constitute a contact or non-contact sealing portion. Also, the guide surface 81 of the retainer and the retainer guide surface of the inner race 33 together constitute a sealing portion and therefore, the lubricant in the bearing is hermetically sealed and thus, this embodiment is a bearing whose width is not long and in which the number of parts is not great and which is reduced in cost and has a sealing performance Also, this embodiment is a standard sealing type self-aligning roller bearing of international interchangeability whose outside diameter, inside diameter and width are invariable.

Figure 27:
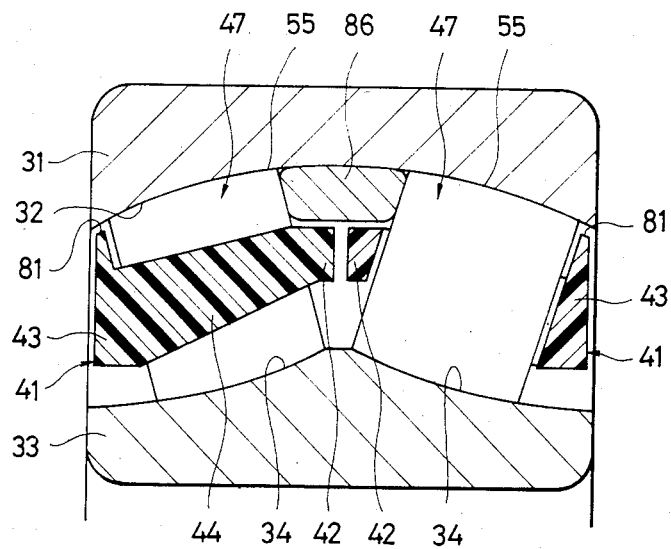

In the tenth embodiment of FIG. 27, the outer peripheral surface of the annular portion 43 axially outside the bearing is a retainer guide surface 81 which is guided by the retainer guide surface of the outer race 31. A float guide race 86 is disposed between two rows of rollers 47 and is fitted to the outer race 31. The float guide race 86 is guided by the outer race 31 and guides the end surfaces of the rollers 47 which are inside the bearing and the retainers 41.

Figure 28:
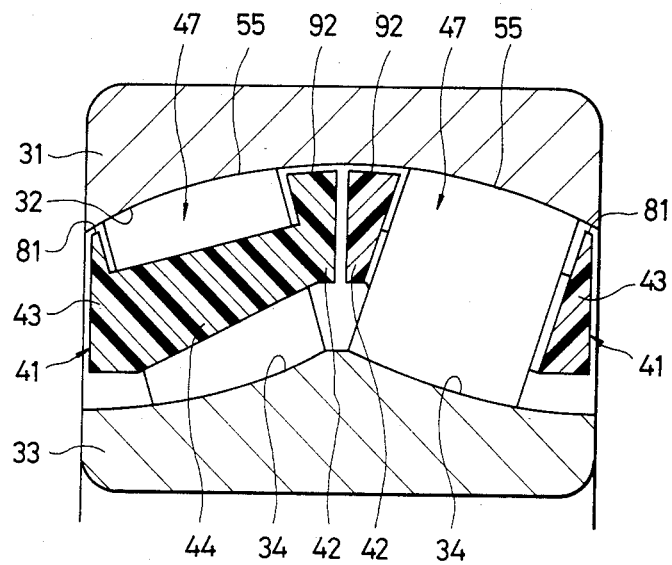

In the eleventh embodiment of FIG. 28, the outer peripheral surfaces of the annular portions 42 inside the bearing are retainer guide surfaces 92 which are guided by the retainer guide surface of the outer race 31.

Figure 29:
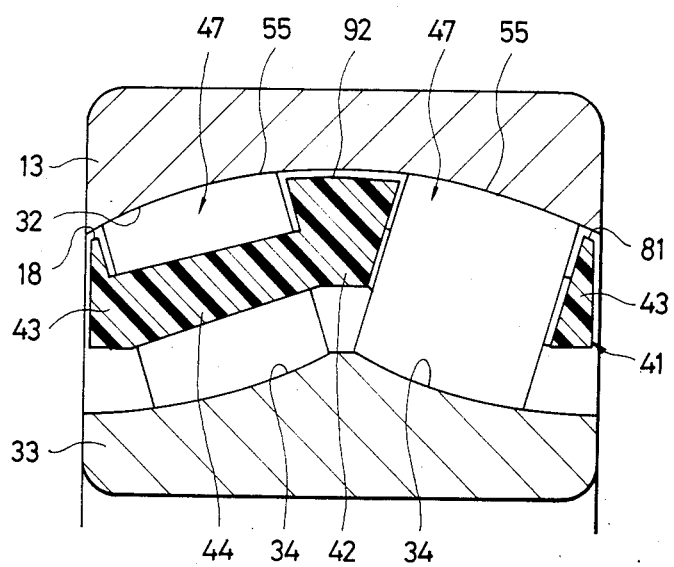

In the twelfth embodiment of FIG. 29, a pair of annular portions 43 on the axially opposite sides of the bearing are integrally connected together through the cross bar 44 and the annular portion 42 inside the bearing.

Figure 30:
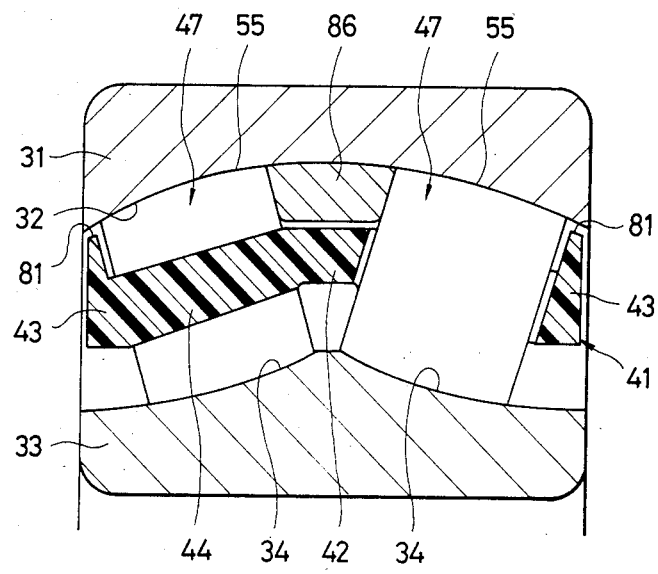

In the thirteenth embodiment of FIG. 30, a float guide race 86 disposed between two rows of rollers 47 is fitted to the outer race 31 and this outer race 31 guides the float guide race 86. Also, the float guide race 86 guides the end surfaces of the rollers 47 which are inside the bearing and the retainer 41.

Figure 31:
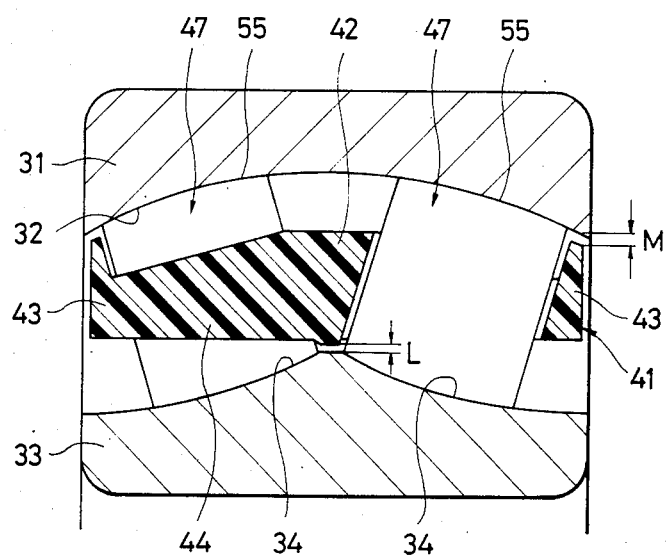

In the fourteenth embodiment of FIG. 31, the annular portion 42 inside the bearing is fitted to the inner race 33 and this inner race 33 guides the retainer 41.

Figure 32:
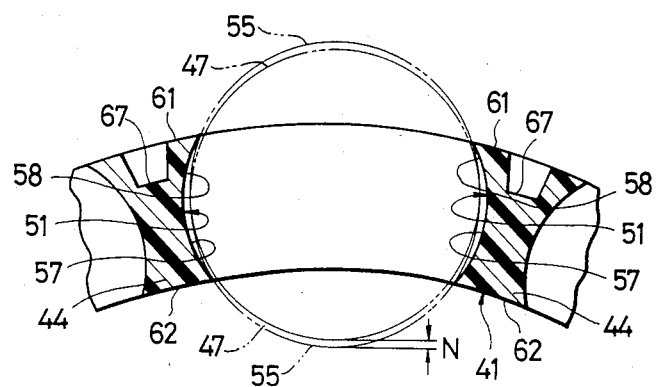
FIG. 32 illustrates the radial clearance between the side surfaces of the cross bars shown in FIG. 31 and the roller.

If both the radial clearance L between the retainer 41 and the inner race 33 and the radial clearance M between the retainer 41 and the outer race 31 are made greater than the radial clearance N between the side surface 51 of the cross bar and the roller 47 shown in FIG. 32, the retainer 41 will be guided by the roller 47 without contacting the track races 31 and 33, thus preventing occurrence of a lock phenomenon in which the retainer 41 becomes integral with the track races 31 and 33 due to its thermal contraction or thermal expansion.

Figure 33:
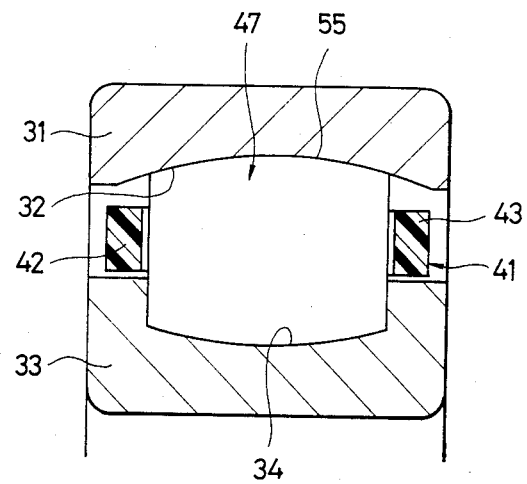
FIG. 33 is a cross-sectional view of a roller bearing according to a fifteenth embodiment of the present invention.
Figure 34:
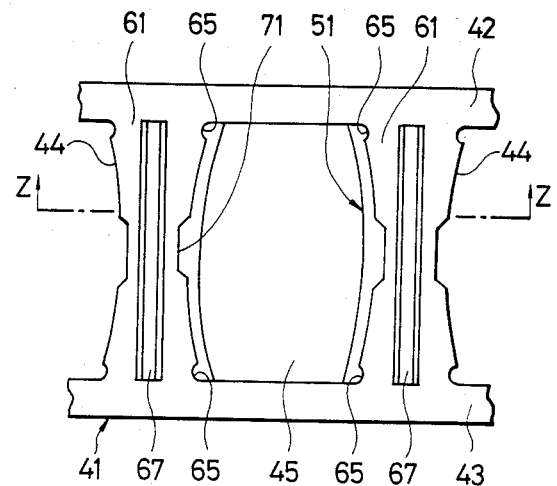
FIG. 34 is a plan view of the retainer shown in FIG. 33.
Figure 35:
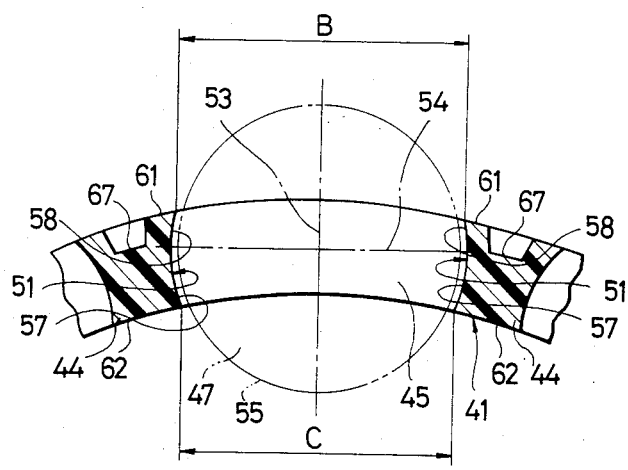
FIG. 35 is an enlarged cross-sectional view taken along the line Z—Z of FIG. 34.

FIG. 33 shows a single row self-aligning roller bearing according to a fifteenth embodiment of the present invention. The inner race 33 has a single row of inner race track 34. Also, a retainer 41 made of synthetic resin is disposed between the outer race 31 and the inner race 33, and this retainer 41 is such that, as shown in FIG. 34, two axially spaced apart annular portions 42 and 43 are integrally connected together by a plurality of circumferentially spaced apart cross bars 44. A barrel shaped roller 47 is disposed in the pocket 45 surrounded by the two adjacent cross bars 44 and the two annular portions 42 and 43, and the side surfaces 51 of the cross bars forming the pocket 45, as shown in FIG. 35, have concavely curved surfaces 57 and 58 having an arc of a curvature corresponding to the rolling surface 55 axially and radially of the bearing, in a portion inside the bearing and a portion outside the bearing with respect to a plane 54 perpendicular to a plane 53 containing the axis of the bearing and the axis of the roller and containing the axis of the roller. Both the spacing B between the outer peripheral surface of a cross bar and the outer peripheral surface of the adjacent cross bar and the spacing C between the inner peripheral surface of a cross bar and the inner peripheral surface of the adjacent cross bar are shorter than the diameter of the roller 47 in the opposed portions thereof, and grooves 65 extending radially of the bearing are provided in the boundary portions between the side surfaces 51 of the cross bars and the annular portions 42, 43. Axially extending grooves 67 are provided in the circumferential central portions of the outer peripheral surfaces 61 of the cross bars, and a recess 71 is provided in the axially central portion of the side surface 51 of each cross bar.

In the eighth to fifteenth embodiments shown above, self-aligning roller bearings are shown, but alternatively, they may be conical roller bearings and cylindrical roller bearings. Also, the boundary portions between the side surfaces 51 of the cross bars and the annular portions 42, 43 may have the radially extending grooves 65 in at least one of the radially outer peripheral portion and inner peripheral portion. Further, at least one of the outer peripheral surface 61 of a cross bar and a inner peripheral surface 62 of a cross bar may have an axially extending groove 67. If an inner peripheral surface 62 of a cross bar has the axially extending groove, the metal mold 82 in the pocket can be removed radially inwardly.

Also, as regards the retainer 41, the spacing B between the outer peripheral surface of a cross bar and the outer peripheral surface of the adjacent cross bar may have a portion longer than the diameter of the roller 47 in the opposed portions thereof and the spacing C between the inner peripheral surface of a cross bar and the inner peripheral surface of the adjacent cross bar may have a portion longer than the diameter of the roller 47 in the opposed portions thereof. Also, when the more inner portions of the annular portions 42 and 43 than the inner peripheral surfaces 62 of the cross bars tend to be warped inwardly of the bearing, if the clearance between the more inner portions of the annular portions 42 and 43 than the inner peripheral surfaces 62 of the cross bars and the roller 47 is made greater than the clearance between the portions of the annular portions 42 and 43 between the inner peripheral surfaces 62 of the cross bars and the outer peripheral surfaces 61 of the cross bars and the roller 47, the more inner portions of the annular portions 42 and 43 than the inner peripheral surfaces 62 of the cross bars will not restrain the end surface of the roller 47 during the operation of the bearing. Further, when the more outer portions of the annular portions 42 and 43 than the outer peripheral surfaces 61 of the cross bars tend to be warped inwardly of the bearing, if the clearance between the more outer portions of the annular portions 42 and 43 than the outer peripheral surfaces 61 of the cross bars and the roller 47 is made greater than the clearance between the portions of the annular portions 42 and 43 between the inner peripheral surfaces 62 and the outer peripheral surfaces 61 of the cross bars and the roller 47, the more outer portions of the annular portions 42 and 43 than the outer peripheral surfaces 61 of the cross bars will not restrain the end surface of the roller 47 during the operation of the bearing.

Also, if the circumferential clearance between the rolling surface 55 of the roller and the side surfaces 51 of the cross bars is made smaller than the axial clearance between the end surface of the roller and the annular portions 42, 43, the rolling surface 55 of the roller will be guided by the side surfaces 51 of the cross bars and therefore, making the circumferential clearance between the rolling surface 55 of the roller and the side surfaces 51 of the cross bars small is effective to prevent skew of the roller 47. To minimize the variation in the dimensions of the retainers 41 resulting from a variation in the temperature thereof and to enhance the rigidity of the retainers 41, fillers such as glass fiber and carbon fiber may be added to synthetic resin. In this case, the radially extending grooves 65 and the axially extending grooves 67 are particularly effective for resilient deformation of the cross bars 44.

As has hitherto been described, in the roller bearings shown in FIGS. 17-35, radially extending grooves are provided in the boundary portions between the side surfaces of the cross bars forming the pocket and the annular portions, and this leads to the effect that the concentration of stress applied to the boundary portions between the side surfaces of the cross bars and the annular portions is alleviated and destruction of the retainers and disturbance of the shape of the side surfaces of the cross bars can be prevented.

Reference is now had to FIGS. 36 to 52 to describe embodiments of the present invention in which the axial opposite ends of the side surfaces of the cross bars forming the pocket of the retainer have contact portions adapted to contact the rolling surface of the roller during the operation of the bearing, in a portion inside the bearing and a portion outside the bearing with respect to a plane perpendicular to a plane containing the axis of the bearing and the axis of the roller and containing the axis of the roller, and the retainer has a portion in which the spacing between the outer peripheral surface of a cross bar and the outer peripheral surface of the adjacent cross bar is shorter than the diameter of the roller in the opposed portions thereof and a portion in which the spacing between the inner peripheral surface of a cross bar and the inner peripheral surface of the adjacent cross bar is shorter than the diameter of the roller in the opposed portions thereof.

Figure 36:
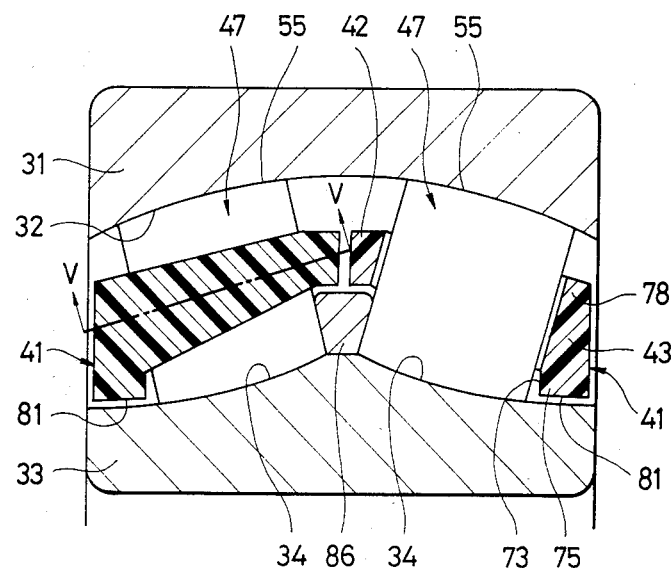
FIG. 36 is a cross-sectional view of a roller bearing according to a sixteenth embodiment of the present invention.
Figure 37:
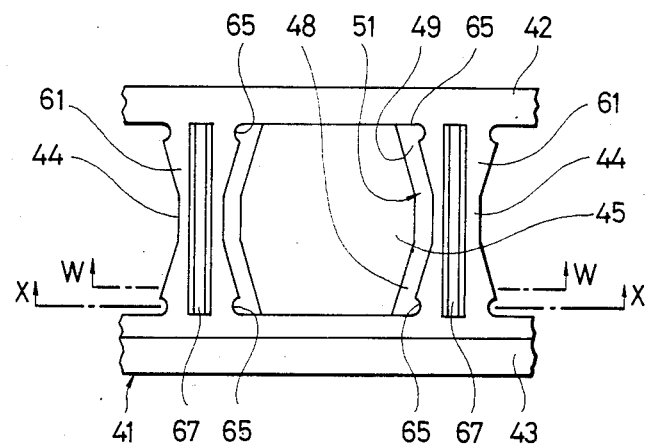
FIG. 37 is a plan view of the retainer shown in FIG. 36.
Figure 38:
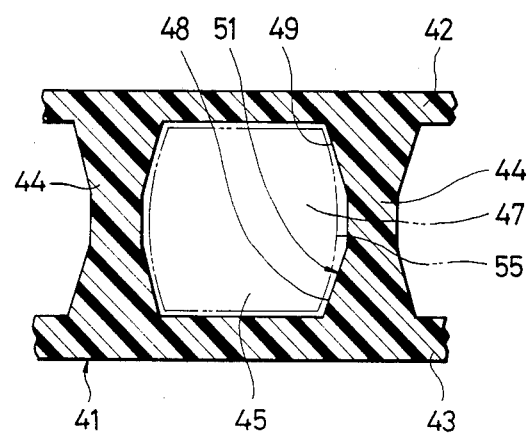
FIG. 38 is a cross-sectional view taken along the line V—V of FIG. 36.
Figure 39:
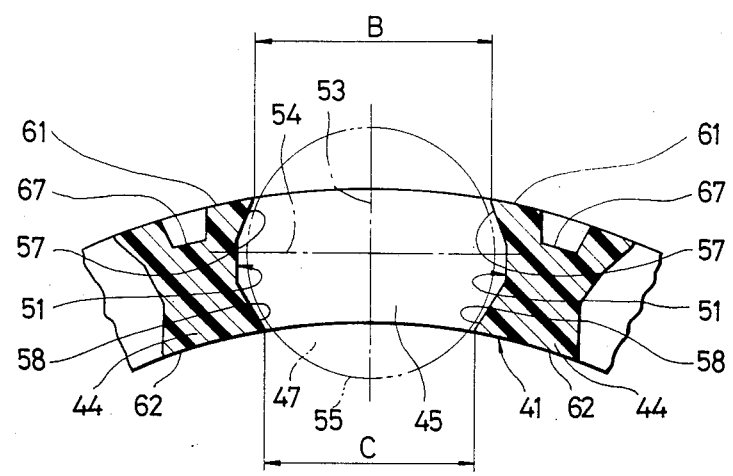
FIG. 39 is an enlarged cross-sectional view taken along the line W—W of FIG. 37.
Figure 40:
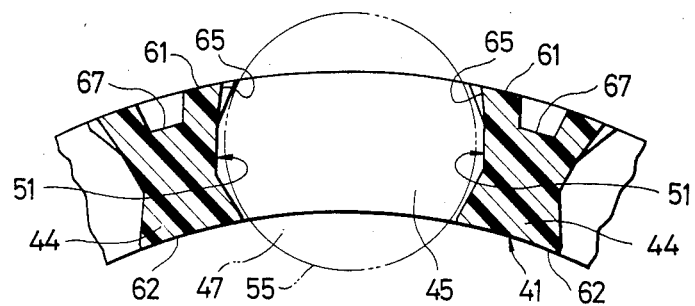
FIG. 40 is an enlarged cross-sectional view taken along the line X—X of FIG. 37.
Figure 41:
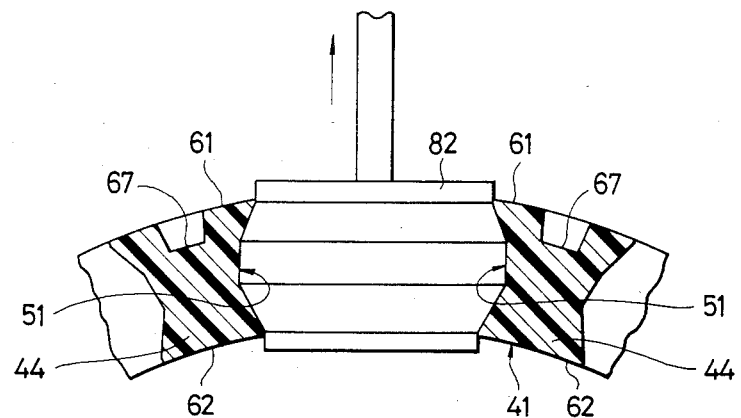
FIG. 41 illustrates the procedure when a metal mold in the pocket is removed.

FIG. 36 shows a sixteenth embodiment of the double-row self-aligning roller bearing of the present invention. The outer race 31 has a spherical outer race track 32 and the inner race 33 has two rows of inner race tracks 34 axially spaced apart. Two retainers 41 made of synthetic resin are disposed between the outer race 31 and the inner race 33, and these two retainers 41 are plane-symmetrical with respect to a plane perpendicular to the axis of the bearing. Each of the retainers is such that, as shown in FIG. 37, two axially spaced apart annular portions 42 and 43 are connected together by a plurality of circumferentially equally spaced apart cross bars 44, and the two annular portions 42 and 43 and the plurality of cross bars 44 are integral with one another. Barrel shaped rollers 47 are disposed in a pocket 45 surrounded by the two adjacent cross bars 44 and the two annular portions 42, 43, and the axial opposite ends 48 and 49 of the side surfaces of the cross bars forming the pocket 45, as shown in FIG. 39, have planar contact portions 57 and 58 adapted to contact the rolling surface 55 of the rollers during the operation of the bearing, in a portion inside the bearing and a portion outside the bearing with respect to a plane 54 perpendicular to a plane 53 containing the axis of the bearing and the axis of the roller and containing the axis of the roller. Accordingly, the axial opposite ends 48 and 49 of the side surfaces of the cross bars have contact portions 57 and 58 at four locations. Both the spacing B between the outer peripheral surface of a cross bar and an outer peripheral surface of the adjacent cross bar and the spacing C between an inner peripheral surface of a cross bar and the inner peripheral surface of the adjacent cross bar are shorter than the diameter of the barrel shaped roller 47 in the opposed portions thereof. Accordingly, both the circumferential width dimension of the outer peripheral surfaces 61 of the cross bars and the circumferential width dimension of the inner peripheral surfaces of the cross bars are great and therefore, the rigidity of the cross bars 44 is strong, and since the rollers 47 are prevented from falling off from within the pocket 45, assembly of the bearing and automation of the assembly of the bearing is easy. As shown in FIGS. 37 and 40, grooves 65 extending radially of the bearing and having an arcuate cross-section are provided in the radially outer peripheral portions in the boundary portions between the axial opposite ends 48, 49 of the side surfaces of the cross bars and the annular portions 42, 43, and these radially extending grooves 65 alleviate the concentration of stress applied to the boundary portions between the axial opposite ends 48, 49 of the side surfaces of the cross bars and the annular portions 42, 43 during the injection molding of the retainers 41, during the insertion of the rollers 47 into the pocket and during the operation of the bearing, thereby preventing the retainers 41 from being destroyed and the shape of the side surfaces 51 of the cross bars from being disturbed. A groove 67 extending axially of the bearing is provided in the circumferential central portion of the outer peripheral surface 61 of each cross bar, and this axially extending groove 67 makes the circumferential opposite end portions of the outer peripheral surfaces 61 of the cross bars easy to be resiliently deformed during the injection molding of the retainers 41 and during the insertion of the rollers 47 into the pocket 45, and this is effective to prevent the shape of the side surfaces 51 of the cross bars from being disturbed and the retainers 41 from being destroyed. The side surface 73 of the annular portion on the side surface side of the bearing which is inside the bearing in the more innner portion than the inner peripheral surfaces of cross bars is a flat surface perpendicular to the axis of the bearing, and the clearance between the more inner portion 75 of the annular portion on the side surface side of the bearing than the inner peripheral surfaces of the cross bars and the rollers 47 is greater than the clearance between the outer peripheral portion 78 of the annular portion on the side surface side of the bearing and the rollers 47. Accordingly, the more inner portion 75 of the annular portion on the side surface side of the bearing than the inner peripheral surfaces of the cross bars tends to be warped inwardly of the bearing by the deformation during the injection molding of the retainers 41, the deformation resulting from the centrifugal force during the operation of the bearing and the deformation resulting from the temperature rise during the operation of the bearing, but the more inner portion 75 of the annular portion on the side surface side of the bearing than the inner peripheral surfaces of the cross bars does not restrain the end surface of the spherical rollers 47 during the operation of the bearing. A lubricant such as grease is held in the clearance between the more inner portion 75 of the annular portion on the side surface side of the bearing than the inner peripheral surfaces of the cross bars and the rollers 47, and the lubricant in this clearance flows out into the pocket 45, whereby the oil film breakage by the edge of the boundary portion between the end surface and the rolling surface 55 of the rollers 47 is prevented. The inner peripheral surface of the annular portion 43 on the side surface side of the bearing is a retainer guide surface 81 which is guided by the retainer guide surface of the inner race 33. The retainers 41 may be manufactured by injection molding of synthetic resin, and more specifically, by removing a metal mold 82 in the pocket radially outwardly as shown in FIG. 41. In this case, the circumferential opposite end portions of the outer peripheral surfaces 61 of the cross bars are somewhat resiliently deformed, and also the circumferential opposite end portions of the outer peripheral surfaces 61 of the cross bars are somewhat resiliently deformed during the insertion of the rollers 47 into the pocket 45. A float guide race 86 is disposed between the two rows of inner race tracks 34 is fitted to the inner race 33. The float guide race 86 is guided by the inner race 33 and guides the end surfaces of the rollers 47 which are inside the bearing and the retainers 41.

Figure 42:
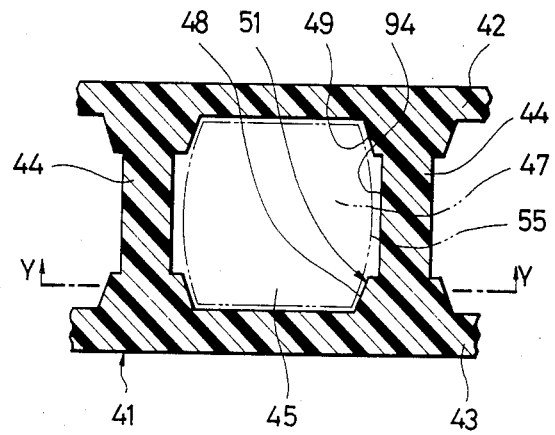
FIG. 42 is a cross-sectional view of a modification of the retainer in the sixteenth embodiment.
Figure 43:
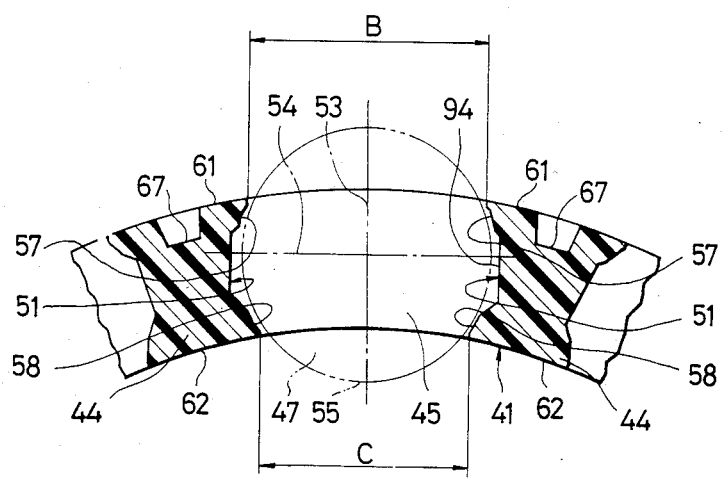
FIG. 43 is an enlarged cross-sectional view taken along the line Y—Y of FIG. 42.

FIG. 42 shows a modification of the retainer used in the sixteenth embodiment. All of the four contact portions 57 and 58 in the axial opposite end portions 48 and 49 of the side surfaces of the cross bars are concavely curved surfaces having axially and radially an arc of a curvature corresponding to the rolling surface 55 of the rollers. The contact portions 57 and 58 make surface contact with the rollers 47, and the side surface 51 of each cross bar is such that, as shown in FIG. 43, the portion between the four contact portions 57 and 58 provides a cross-shaped recess 94 for holding lubricant therein. The other portions of the embodiment shown in FIG. 42 are constructed similarly to the embodiment of FIGS. 36 to 40.

Figure 44:
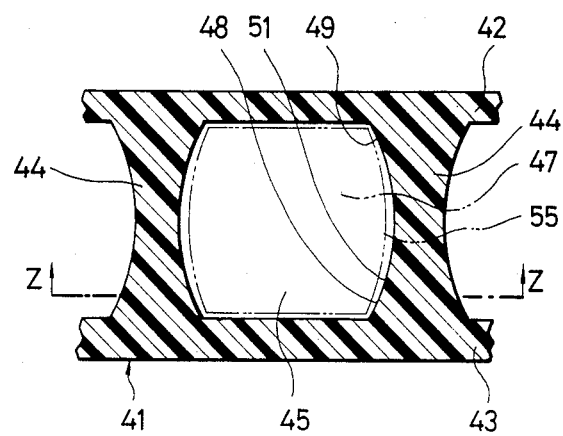
FIG. 44 is a cross-sectional view of a second modification of the retainer in the sixteenth embodiment.
Figure 45:
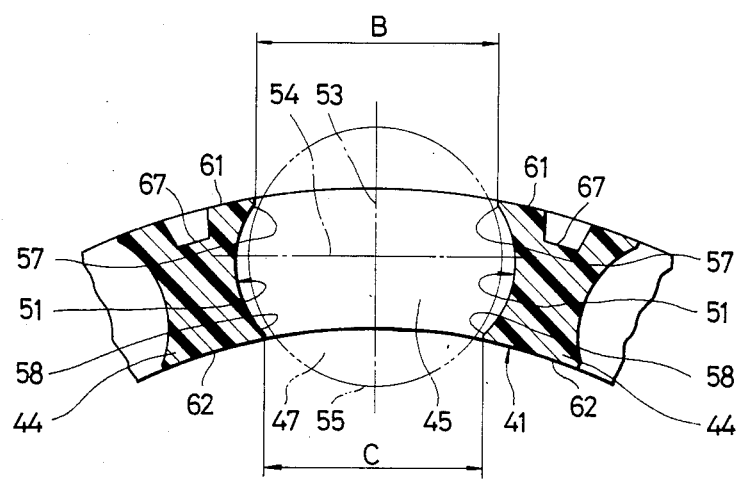
FIG. 45 is an enlarged cross-sectional view taken along the line Z—Z of FIG. 44.

FIG. 44 shows another modification of the retainer used in the sixteenth embodiment. As regards the side surfaces 51 of the cross bars, the cross-section by a plane containing the axis of the roller 47 is an arc whose curvature is greater than the curvature of the arc of the roller 47 in the opposed portions thereof. Also, the side surfaces 51 of the cross bars are such that the cross-section perpendicular to the axis of the roller 47 is an arc as shown in FIG. 45, the curvature of this arc being greater than the curvature of the arc of the roller 47 in the opposed portions thereof. Accordingly, the four contact portions 57 and 58 of the axial opposite end portions 48 and 49 of the side surfaces of the cross bars are all of horizontal dog-legged shape. The other portions of the embodiment shown in FIG. 44 are constructed similarly to the embodiment of FIGS. 36 to 40.

Figure 46:
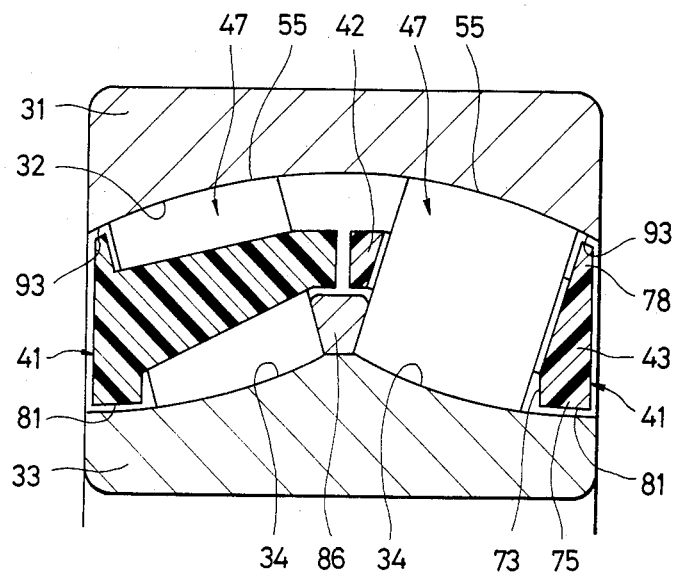
FIGS. 46 to 51 are cross-sectional views of roller bearings according to seventeenth to twenty-second embodiments of the present invention.

FIGS. 46 to 51 show double-row self-aligning roller bearings, according to seventeenth to twenty-second embodiments of the present invention. In FIG. 46, the outer peripheral surface of the annular portion 43 on the side surface side of the bearing, and a sealing surface 93 provided in the outer race 31 together constitute a contact or non-contact sealing portion. Also, the guide surfaces 81 of the retainers and the retainer guide surface of the inner race 33 together constitute a sealing portion in which the lubricant in the bearing is hermetically sealed, and this embodiment is a roller bearing whose width is not long and in which the number of parts is not great and which is reduced in cost and has a sealing performance. This embodiment is also a standard sealing type self-aligning roller bearing of international interchangeability whose outside diameter, inside diameter and width are invariable.

Figure 47:
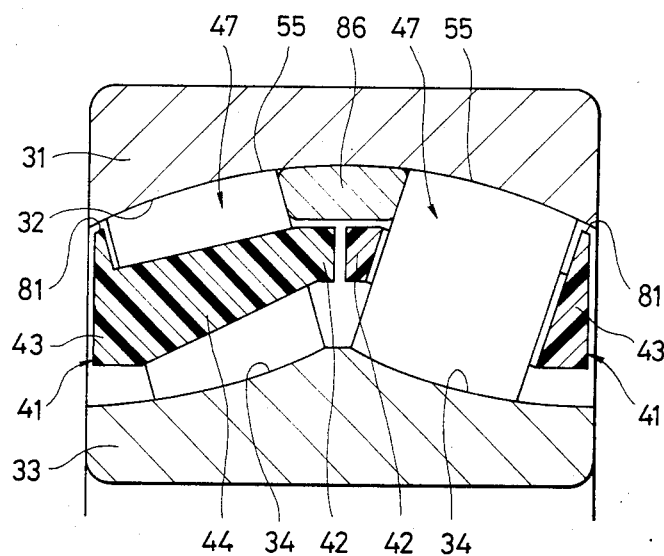

FIG. 47 shows an eighteenth embodiment. The outer peripheral surfaces of the annular portions 43 on the side surface side of the bearing are the guide surfaces 81 of the retainers, which are guided by the retainer guide surface of the outer race 31. A float guide race 86 is disposed between two rows of rollers 47 and is fitted to the outer race 31. The float guide race 86 is guided by the outer race 31 and guides the end surfaces of the roller 47 which are inside the bearing and the retainers 41.

Figure 48:
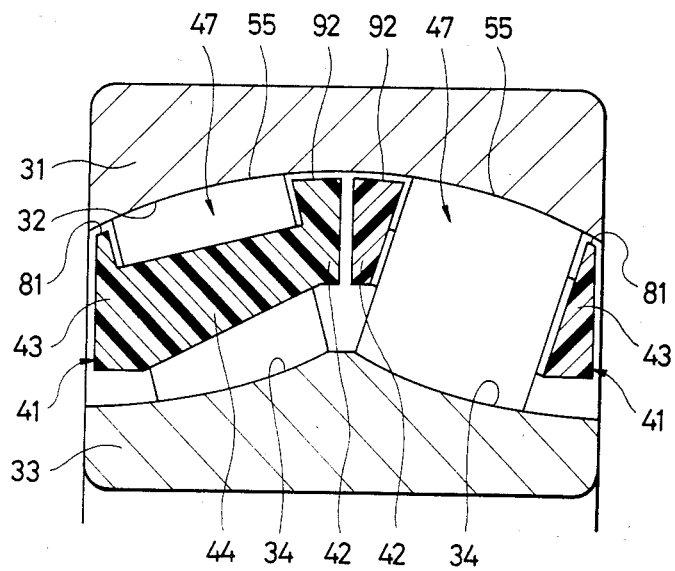

FIG. 48 shows nineteenth embodiment. The outer peripheral surfaces of the annular portions 42 inside the bearing are the guide surfaces 92 of the retainers which are guided by the retainer guide surface of the outer race 31.

Figure 49:
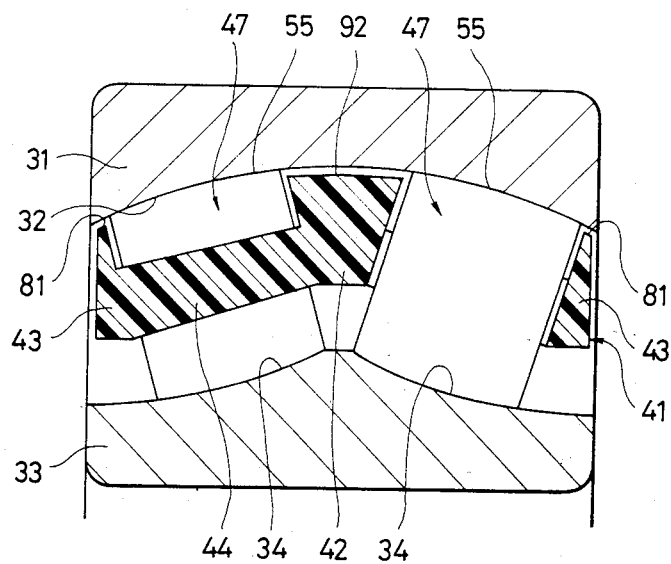

FIG. 49 shows a twentieth embodiment. The annular portions 43 on the axial opposite sides of the bearing are integrally connected together through the cross bar 44 and the annular portion 42 inside the bearing.

Figure 50:
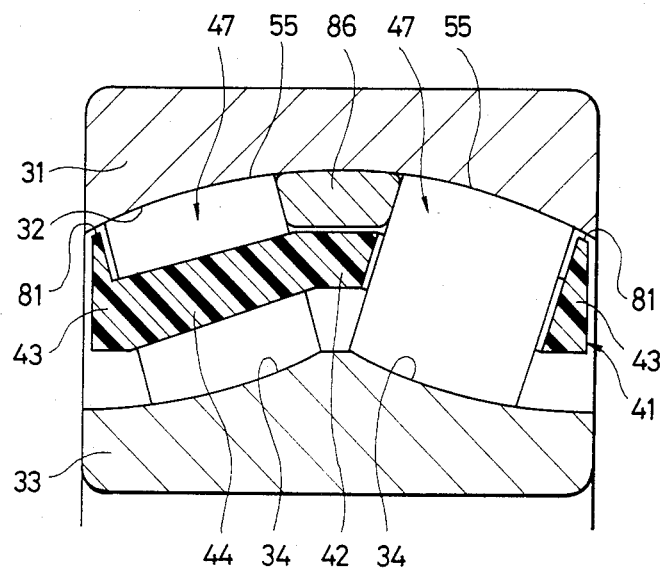

FIG. 50 shows a twenty-first embodiment. A float guide race 86 disposed between two rows of rollers 47 is fitted to the outer race 31 and is guided by the outer race 31. The float guide race 86 guides the end surfaces of the rollers 47 which are inside the bearing and the retainer 41.

Figure 51:
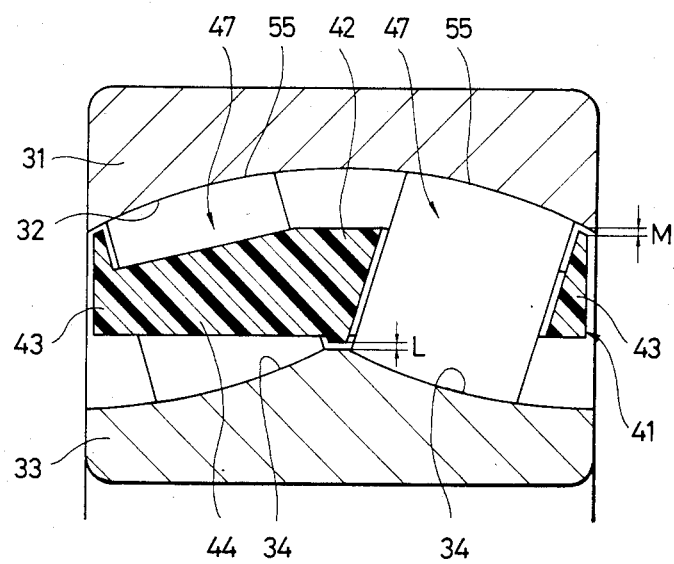

FIG. 51 shows a twenty-second embodiment. The annular portion 42 inside the bearing is fitted to the inner race 33 and the retainer 41 is guided by the inner race 33.

Figure 52:
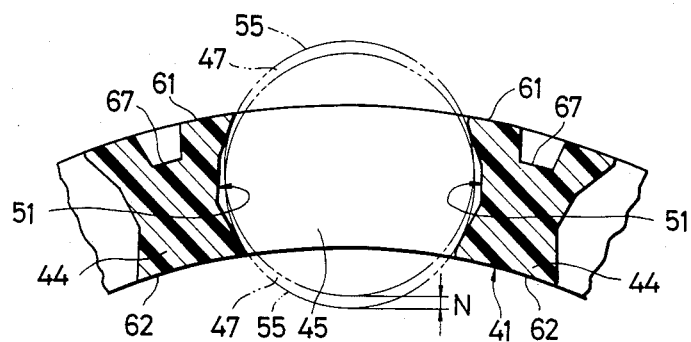
FIG. 52 illustrates the radial clearance between the side surfaces of the cross bars and the roller.

If both the radial clearance L between the retainer 41 and the inner race 33 and the radial clearance M between the retainer 41 and the outer race 31 are made greater than the radial clearance N between the side surfaces 51 of the cross bars and the roller 47 shown in FIG. 52, the retainer 41 will be guided by the rollers 47 without contacting the track races 31 and 33, thereby preventing occurrence of a lock phenomenon in which the retainer 41 becomes integral with the track races 31 and 33 due to its thermal contraction or thermal expansion.

The side surfaces 51 of the cross bars may be provided with contact portions at the other locations than the axial opposite end portions 48 and 49 of the side surfaces of the cross bars, and the side surfaces 51 of the cross bars may have contact portions at five or more locations.

Further, the boundary portions between the axial opposite end portions 48, 49 of the side surfaces of the cross bars and the annular portions 42, 43 may have a radially extending groove 65 in at least one of the radial outer peripheral portion and inner peripheral portion.

Also, at least one of the outer peripheral surface 61 and the inner peripheral surface 62 of each cross bar may have an axially extending groove 67. If the inner peripheral surface 62 of each cross bar has the axially extending groove, the metal mold 82 in the pocket can be removed radially inwardly.

Further, the retainer 41 may have a portion in which the spacing B between the outer peripheral surface of a cross bar and the outer peripheral surface of the adjacent cross bar is longer than the diameter of the roller 47 in the opposed portions thereof and a portion in which the spacing C between the inner peripheral surface of a cross bar and the inner peripheral surface of the adjacent cross bar is longer than the diameter of the roller 47 in the opposed portions thereof.

Also, when the more inner portions of the annular portions 42 and 43 than the inner peripheral surfaces 62 of the cross bars and the more outer portions of the annular portions 42 and 43 than the outer peripheral surfaces 61 of the cross bars tend to be warped inwardly of the bearing, if the clearance between the more inner portions of the annular portions 42 and 43 than the inner peripheral surfaces 62 of the cross bars and the rollers 47 and the clearance between the more outer portions of the annular portions 42 and 43 than the outer peripheral surfaces 61 of the cross bars and the rollers 47 are made greater than the clearance between the portions of the annular portions 42 and 43 between the inner peripheral surfaces 62 and the outer peripheral surfaces 61 of the cross bars and the rollers 47, the more inner portions of the annular portions 42 and 43 than the inner peripheral surfaces 62 of the cross bars and the more outer portions of the annular portions 42 and 43 than the outer peripheral surfaces 61 of the cross bars will not restrain the end surfaces of the rollers 47 during the operation of the bearing.

As regards the retainer 41 made of synthetic resin, the side surfaces 51 of the cross bars are resiliently deformed when the metal mold 82 is removed from within the pocket and therefore, the side surfaces 51 of the cross bars are inferior in shape accuracy. Accordingly, if the clearance between the rollers 47 and the side surfaces 51 of the cross bars is designed to be equal from the axial central portion toward the opposite ends of the roller 47, the injection-molded retainer 41 will suffer from the possibility that the clearance between the rollers 47 and the side surfaces 51 of the cross bars becomes greater from the axial central portion toward the opposite ends of the roller 47, and this may promote skew of the rollers 47 and bring about temperature rise of the bearing. The present invention, with the machining accuracy of the retainer 41 taken into account, enables the axial opposite end portions 48 and 49 of the side surfaces of the cross bars to be designed so as to have contact portions 57 and 58 at four locations and thus, the injection-molded retainer 41 becomes such that the axial opposite end portions 48 and 49 of the side surfaces of the cross bars have contact portions 57 and 58 at four locations, whereby the promotion of the skew by the machining accuracy of the retainer 41 can be prevented.

Since the retainer 41 made of synthetic resin contracts during high temperatures, there is a possibility of the retainer 41 locking the rollers 47 during high temperatures. If the axial opposite end portions 48 and 49 of the side surfaces of the cross bars have the contact portions 57 and 58 at four locations, the area of contact between the side surfaces 51 of the cross bars and the rollers 47 is small and therefore, even if the retainer 41 comes into intimate contact with the rollers 47 during high temperatures the friction force between the retainer 41 and the rollers 47 is smaller than the driving force of the rollers 47 and the rollers 47 slide relative to the side surfaces 51 of the cross bars and thus, the retainer 41 does not lock the rollers 47. Also, if the area of contact between the side surfaces 51 of the cross bars and the rollers 47 is small, the contact surface pressure of the side surfaces 51 of the cross bars and the rollers 47 is high, but since synthetic resin is resiliently deformed, the area of contact between the side surfaces 51 of the cross bars and the rollers 47 is increased, and since synthetic resin has a low friction coefficient, the abrasion of the side surfaces 51 of the cross bars is suppressed.

In the roller bearings according to the sixteenth to twenty-second embodiments, the side surfaces 51 of the cross bars have contact portions 57 and 58 in a portion inside the bearing and a portion outside the bearing with respect to the plane 54 perpendicular to the plane 53 containing the axis of the bearing and the axis of the roller and containing the axis of the roller and therefore, even if the retainer 41 moves radially relative to the rollers 47, the circumferential clearance between the rollers 47 and the side surfaces 51 of the cross bars does not become great and the rollers 47 are stably supported by the side surfaces 51 of the cross bars and are not liable to be inclined and thus, skew of the rollers 47 is prevented. Also, the axial opposite end portions 48 and 49 of the side surfaces of the cross bars have contact portions 57 and 58 and therefore, the rollers 47 are stably supported by the side surfaces 51 of the cross bars and are not liable to be inclined and thus, skew of the rollers 47 is prevented. Further, the retainer 41 has a portion in which the spacing B between the outer peripheral surface of a cross bar and the outer peripheral surface of the adjacent cross bar is shorter than the diameter of the roller 47 in the opposed portions thereof and a portion in which the spacing C between the inner peripheral surface of a cross bar and the inner peripheral surface of the adjacent cross bar is shorter than the diameter of the roller 47 in the opposed portions thereof and therefore, both the outer peripheral surfaces 61 and the inner peripheral surfaces 62 of the cross bars are great in their circumferential width dimension and the rigidity of the cross bars 44 is strong. Also, the rollers 47 are prevented from falling off from within the pocket 45 and this leads to the effect that assembly of the bearing and automatization of the assembly of the bearing is easy.

While double-row self-aligning roller bearings have been shown in the embodiments illustrated, the roller bearing of the present invention may also be a single-row self-aligning roller bearing, a conical roller bearing or a cylindrical roller bearing.

What is claimed is:

1. A double-row self-aligning roller bearing including:
   an inner race having first and second outer race tracks on an outer periphery thereof;
   an outer race having an inner race track on an inner periphery thereof, the inner race track being opposed to said first and second outer race tracks of the inner race and radially distant therefrom;
   a first row of rollers disposed between the first outer race track of the inner race and the inner race track of the outer race, each roller having a barrel-shaped rolling surface;
   a second row of rollers disposed between the second outer race track of the inner race and the inner race track of the outer race, each roller having a barrel-shaped rolling surface;
   a first annular retainer for retaining said first row of barrel-shaped rollers;
   a second annular retainer for retaining said second row of barrel-shaped rollers;
   and being characterized in that:
   said first annular retainer is formed of a single-piece, unitary, integral structure of synthetic resin and comprises first and second annular portions axially apart from each other, and cross bars integrally connecting said first and second annular portions and disposed circumferentially equidistantly to form pockets for receiving respectively the first row of barrel-shaped rollers therein, side surfaces of each cross bar being concave axially and radially corresponding to the barrel-shaped rolling surfaces of the corresponding rollers.

2. A double-row self-aligning roller bearing according to claim 1 wherein at least one side surface of at least some of the cross bars has a groove extending radially inwardly from an outer peripheral surface of the cross bar to hold lubricant.

3. A double-row self-aligning roller bearing according to claim 2 wherein said second annular retainer is formed of a single piece unitary integral structure and comprises first and second annular portions axially apart from each other, and cross bars integrally connecting said first and second annular portions and disposed circumferentially equidistantly to form pockets for receiving respectively the second row of barrel-shaped rollers therein, side surfaces of each cross bar being concave axially and radially corresponding to the barrel-shaped rolling surfaces of the corresponding rollers.

4. A double-row self-aligning roller bearing according to claim 3 wherein at least one side surface of at least some of the cross bars has a groove extending radially inwardly from an outer peripheral surface of the cross bar to hold lubricant.

5. A double-row self-aligning roller bearing according to claim 4 wherein an axially extending groove is formed on an outer periphery of at least some of the cross bars between the side surfaces thereof.

6. A double-row self-aligning roller bearing according to claim 5 wherein a recess extending radially from an outer periphery of the retainer is formed at each corner of each pocket defined by said annular portions and cross bars.

7. A double-row self-aligning roller bearing according to claim 3 wherein each of said retainers has a portion in which a distance between an outer peripheral portion of a cross bar and an outer peripheral portion of an adjacent cross bar is, in each cross section perpendicular to an axis of the bearing, shorter than the diameter of a corresponding roller, and a portion in which a distance between an inner peripheral portion of a cross bar and an inner peripheral portion of an adjacent cross bar is, in each cross section perpendicular to an axis of the bearing, shorter than the diameter of the corresponding roller.

8. A self-aligning roller bearing including:
an inner race having an outer race track on an outer periphery thereof;
an outer race having an inner race track on an inner periphery thereof, the inner race track being opposed to said outer race track of the inner race and radially distant therefrom;
a row of rollers disposed between the outer race track of the inner race and the inner race track of the outer race, each roller having a barrel-shaped rolling surface;
an annular retainer for retaining said row of barrel-shaped rollers;
and being characterized in that:
said annular retainer is formed of a single-piece, unitary, integral structure of synthetic resin and comprises first and second annular portions axially apart from each other, and cross bars integrally connecting said first and second annular portions and disposed circumferentially equidistantly to form pockets for receiving respectively the barrel-shaped rollers therein, side surfaces of each cross bar being concave axially and radially corresponding to the barrel-shaped rolling surface of the roller,
said retainer having a portion in which a distance between an outer peripheral portion of a cross bar and an outer peripheral portion of an adjacent cross bar is, in each cross section perpendicular to an axis of the bearing, shorter than the diameter of a corresponding roller, and a portion in which a distance between an inner peripheral portion of the cross bar and an inner peripheral portion of an adjacent cross bar is, in each cross section perpendicular to an axis of the bearing, shorter than the diameter of the corresponding roller.

9. A roller bearing including:
an inner race having a pair of outer race tracks on an outer periphery thereof;
an outer race having an inner race track on an inner periphery thereof, the inner race track being opposed to said outer race track of the inner race and radially distant therefrom;
two rows of rollers disposed between said outer race tracks of the inner race and said inner race track of the outer race, each roller having a barrel-shaped rolling surface;
a pair of annular retainers for retaining said row of barrel-shaped rollers, respectively;
and being characterized in that:
each of said annular retainers is formed of a single-piece, unitary, integral structure of synthetic resin and comprises first and second annular portions axially apart from each other, and cross bars integrally connecting said first and second annular portions and disposed circumferentially equidistantly to form pockets for receiving respectively the barrel-shaped rollers therein, side surfaces of each cross bar being concave axially and radially corresponding to the barrel-shaped rolling surfaces of the corresponding rollers;
each of said retainers having a portion in which a distance between an outer peripheral portion of a cross bar and an outer peripheral portion of an adjacent cross bar is, in each cross seciton perpendicular to an axis of the bearing, shorter than the diameter of a corresponding roller, and a portion in which a distance between an inner peripheral portion of a cross bar and an inner peripheral portion of an adjacent cross bar is, in each cross section perpendicular to an axis of the bearing, shorter than the diameter of the corresponding roller.

10. A self aligning roller bearing comprising:
an inner race,
an outer race coaxially disposed radially outside of the inner race,
a row of barrel-shaped rollers disposed between the inner race and the outer race, and
means for retaining the rollers, the retaining means including an annular member disposed between the inner and outer races and being formed with pockets spaced equidistantly circumferentially to receive the respective rollers and with axially extended cross-bar portions intermediate the respective pockets, the respecitve cross-bar portions having at each axial end thereof radially outer and inner end surface portions which are in contact with a rolling surface of the corresponding roller and a surface portion intermediate said end surface portions which is out of contact with said rolling surface.

11. A self-aligning rolling bearing according to claim 10, further including a second row of barrel-shaped rollers disposed between the inner and outer races, and a second annular member disposed between the inner and outer races and being formed with further pockets spaced equidistantly circumferentially to receive the respective second rollers and with further axially extended cross-bar portions intermediate the respective further pockets, the respective further cross-bar portions having at each axial and thereof radially outer and inner end surface portions which are in contact with a rolling surface of the corresponding second roller and a surface portion intermediate those end surface portions which is out of contact with the rolling surface of the corresponding second roller.

12. A self-aligning roller bearing according to claim 11, wherein said annular member and said second annular member are formed of a single piece, unitary, integral structure of synthetic resin.

13. A self-aligning roller bearing according to claim 10, wherein a recessed portion spaced from the rolling surface of the corresponding roller is formed at an axially central portion of each side surface of the respective cross-bar portions.

14. A double-row self-aligning roller bearing including:
   an inner race having first and second outer race tracks on an outer periphery thereof;
   an outer race having an inner race track on an inner periphery thereof, the inner race tack being opposed to the first and second outer race tracks of the inner race and radially distant therefrom;
   a first tow of rollers disposed between the first outer race track of the inner race and the inner race track of the outer race, each roller having a barrel-shaped rolling surface;
   a second row of rollers disposed between the second outer race track of the inner race and the inner race track of the outer race, each roller having a barrel-shaped rolling surface;
   an annular retainer for retaining the first and second rows of rollers, the retainer being formed of a single-piece, unitary, integral structure of synthetic resin and comprising first, second and third annular potions spaced axially apart from each other, first cross bars integrally connecting the first and second annular portions and disposed circumferentially equidistantly to form pockets for receiving respectively the first row of rollers, and second cross bars integrally connecting the second and third annular portions and disposed circumferentially equidistantly to form pockets for receiving respectively the second row of rollers, with side surfaces of said first and second cross bars being concave axially and radially corresponding to the rolling surfaces of the rollers.

* * * * *